(12) United States Patent
Sinha et al.

(10) Patent No.: US 9,690,630 B2
(45) Date of Patent: Jun. 27, 2017

(54) HARDWARE ACCELERATOR TEST HARNESS GENERATION

(71) Applicant: Synopsys, Inc., Mountain View, CA (US)

(72) Inventors: Navendu Sinha, Milpitas, CA (US); William Charles Jordan, Tres Pinos, CA (US); Bryon Irwin Moyer, Sunnyvale, CA (US); Stephen John Joseph Fricke, Felton, CA (US); Roberto Attias, Alameda, CA (US); Akash Renukadas Deshpande, San Jose, CA (US); Vineet Gupta, San Jose, CA (US); Shobhit Sonakiya, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 10 days.

(21) Appl. No.: 14/637,354

(22) Filed: Mar. 3, 2015

(65) Prior Publication Data
US 2015/0178136 A1    Jun. 25, 2015

Related U.S. Application Data

(60) Continuation of application No. 13/358,407, filed on Jan. 25, 2012, now Pat. No. 9,003,166, which is a
(Continued)

(51) Int. Cl.
*G06F 9/30* (2006.01)
*G06F 9/50* (2006.01)
*G06F 9/54* (2006.01)

(52) U.S. Cl.
CPC .............. *G06F 9/5044* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 4,611,278 | A | 9/1986 | Boothroyd et al. |
| 4,639,886 | A | 1/1987 | Hashimoto et al. |

(Continued)

FOREIGN PATENT DOCUMENTS

| | | |
|---|---|---|
| EP | 0352103 A | 1/1990 |
| EP | 0355069 A2 | 2/1990 |

(Continued)

OTHER PUBLICATIONS

Altera, "Turbo Encoder Co-processor Reference Design", Oct. 2003, p. 1-20.*

(Continued)

*Primary Examiner* — William B Partridge
(74) *Attorney, Agent, or Firm* — Fenwick & West LLP

(57) ABSTRACT

System and method for generating hardware accelerators and processor offloads. System for hardware acceleration. System and method for implementing an asynchronous offload. Method of automatically creating a hardware accelerator. Computerized method for automatically creating a test harness for a hardware accelerator from a software program. System and method for interconnecting hardware accelerators and processors. System and method for interconnecting a processor and a hardware accelerator. Computer implemented method of generating a hardware circuit logic block design for a hardware accelerator automatically from software. Computer program and computer program product stored on tangible media implementing the methods and procedures of the invention.

18 Claims, 37 Drawing Sheets

Related U.S. Application Data division of application No. 11/607,452, filed on Dec. 1, 2006, now Pat. No. 8,127,113.

(56) References Cited

U.S. PATENT DOCUMENTS

| | | |
|---|---|---|
| 4,642,789 A | 2/1987 | Lavelle |
| 4,700,292 A | 10/1987 | Campanini |
| 4,755,966 A | 7/1988 | Lee et al. |
| 4,763,242 A | 8/1988 | Lee et al. |
| 4,890,218 A | 12/1989 | Bram |
| 4,896,258 A | 1/1990 | Yamaguchi et al. |
| 4,974,155 A | 11/1990 | Dulong et al. |
| 4,992,934 A | 2/1991 | Portanova et al. |
| 5,019,967 A | 5/1991 | Wheeler |
| 5,247,637 A | 9/1993 | Leedom et al. |
| 5,361,373 A | 11/1994 | Gilson |
| 5,371,860 A | 12/1994 | Mura et al. |
| 5,402,458 A * | 3/1995 | Moughanni .... G01R 31/318527 377/29 |
| 5,404,319 A | 4/1995 | Smith et al. |
| 5,408,469 A | 4/1995 | Opher et al. |
| 5,450,586 A | 9/1995 | Kuzara et al. |
| 5,488,730 A | 1/1996 | Brown, III et al. |
| 5,491,640 A | 2/1996 | Sharma et al. |
| 5,493,508 A | 2/1996 | Dangelo et al. |
| 5,493,687 A | 2/1996 | Garg et al. |
| 5,502,661 A | 3/1996 | Glunz |
| 5,509,129 A | 4/1996 | Balmer et al. |
| 5,530,965 A | 6/1996 | Kawasaki et al. |
| 5,535,331 A | 7/1996 | Swoboda et al. |
| 5,537,580 A | 7/1996 | Giomi et al. |
| 5,544,067 A | 8/1996 | Rostoker et al. |
| 5,555,201 A | 9/1996 | Dangelo et al. |
| 5,555,384 A | 9/1996 | Roberts et al. |
| 5,590,294 A | 12/1996 | Mirapuri et al. |
| 5,696,956 A | 12/1997 | Razdan et al. |
| 5,703,789 A | 12/1997 | Beausang et al. |
| 5,724,566 A | 3/1998 | Swoboda et al. |
| 5,748,875 A | 5/1998 | Tzori |
| 5,751,984 A | 5/1998 | Chang et al. |
| 5,752,271 A | 5/1998 | Yung |
| 5,758,106 A | 5/1998 | Fenwick et al. |
| 5,774,687 A | 6/1998 | Matsui et al. |
| 5,778,208 A | 7/1998 | Eickemeyer et al. |
| 5,784,603 A | 7/1998 | Leung et al. |
| 5,801,958 A | 9/1998 | Dangelo et al. |
| 5,809,320 A | 9/1998 | Jain et al. |
| 5,812,416 A | 9/1998 | Gupte et al. |
| 5,819,050 A | 10/1998 | Boehling et al. |
| 5,819,064 A | 10/1998 | Razdan et al. |
| 5,838,984 A | 11/1998 | Nguyen et al. |
| 5,841,663 A | 11/1998 | Sharma et al. |
| 5,854,929 A | 12/1998 | Van Praet et al. |
| 5,854,930 A | 12/1998 | McLain, Jr. et al. |
| 5,867,399 A | 2/1999 | Rostoker et al. |
| 5,867,400 A | 2/1999 | El-Ghoroury et al. |
| 5,870,588 A | 2/1999 | Rompaey et al. |
| 5,898,595 A | 4/1999 | Bair et al. |
| 5,898,889 A | 4/1999 | Davis et al. |
| 5,920,711 A | 7/1999 | Seawright et al. |
| 5,948,067 A | 9/1999 | Caldara et al. |
| 5,963,454 A | 10/1999 | Dockser et al. |
| 5,994,892 A | 11/1999 | Turino et al. |
| 5,995,736 A | 11/1999 | Aleksic et al. |
| 5,996,032 A | 11/1999 | Baker |
| 5,999,734 A | 12/1999 | Willis et al. |
| 6,006,022 A | 12/1999 | Rhim et al. |
| 6,009,096 A | 12/1999 | Jaisingh et al. |
| 6,016,543 A | 1/2000 | Suzuki et al. |
| 6,026,219 A | 2/2000 | Miller et al. |
| 6,035,123 A | 3/2000 | Razdan et al. |
| 6,052,518 A | 4/2000 | Shigeta et al. |
| 6,058,438 A | 5/2000 | Diehl et al. |
| 6,088,740 A | 7/2000 | Ghaffari et al. |
| 6,110,218 A | 8/2000 | Jennings |
| 6,110,223 A | 8/2000 | Southgate et al. |
| 6,163,539 A | 12/2000 | Alexander et al. |
| 6,172,540 B1 | 1/2001 | Gandhi |
| 6,173,434 B1 | 1/2001 | Wirthlin et al. |
| 6,182,177 B1 | 1/2001 | Harriman |
| 6,182,206 B1 | 1/2001 | Baxter |
| 6,195,593 B1 | 2/2001 | Nguyen |
| 6,226,776 B1 | 5/2001 | Panchul et al. |
| 6,256,729 B1 | 7/2001 | Cherabuddi et al. |
| 6,269,467 B1 | 7/2001 | Chang et al. |
| 6,317,860 B1 | 11/2001 | Heile |
| 6,321,369 B1 | 11/2001 | Heile et al. |
| 6,324,678 B1 | 11/2001 | Dangelo et al. |
| 6,338,136 B1 | 1/2002 | Col et al. |
| 6,360,350 B1 | 3/2002 | Gabele et al. |
| 6,378,123 B1 | 4/2002 | Dupenloup |
| 6,381,242 B1 | 4/2002 | Maher, III et al. |
| 6,385,757 B1 | 5/2002 | Gupta et al. |
| 6,408,369 B1 | 6/2002 | Garrett et al. |
| 6,408,428 B1 | 6/2002 | Schlansker et al. |
| 6,421,751 B1 | 7/2002 | Gulick |
| 6,421,818 B1 | 7/2002 | Dupenloup et al. |
| 6,453,360 B1 | 9/2002 | Muller et al. |
| 6,457,173 B1 | 9/2002 | Gupta et al. |
| 6,477,683 B1 | 11/2002 | Killian et al. |
| 6,477,697 B1 | 11/2002 | Killian et al. |
| 6,480,489 B1 | 11/2002 | Muller et al. |
| 6,513,102 B2 | 1/2003 | Garrett et al. |
| 6,560,754 B1 | 5/2003 | Hakewill et al. |
| 6,606,301 B1 | 8/2003 | Muller et al. |
| 6,637,018 B1 | 10/2003 | Demler |
| 6,671,743 B1 | 12/2003 | Verity |
| 6,700,888 B1 | 3/2004 | Jonsson et al. |
| 6,701,515 B1 | 3/2004 | Wilson et al. |
| 6,760,888 B2 | 7/2004 | Killian et al. |
| 6,804,679 B2 | 10/2004 | Jevons et al. |
| 6,862,563 B1 | 3/2005 | Hakewill et al. |
| 7,010,558 B2 | 3/2006 | Morris |
| 7,076,595 B1 | 7/2006 | Dao et al. |
| 7,133,984 B1 | 11/2006 | Dickensheets |
| 7,162,608 B2 | 1/2007 | Bethard |
| 7,181,596 B2 | 2/2007 | Henry et al. |
| 7,228,422 B2 | 6/2007 | Morioka et al. |
| 7,246,197 B2 | 7/2007 | Rosenbluth et al. |
| 7,289,537 B1 | 10/2007 | Devanagondi et al. |
| 7,295,575 B2 | 11/2007 | Ido et al. |
| 7,307,986 B2 | 12/2007 | Henderson et al. |
| 7,320,041 B2 | 1/2008 | Biran et al. |
| 7,325,122 B2 | 1/2008 | Abdelilah et al. |
| 7,337,201 B1 | 2/2008 | Yellin et al. |
| 7,380,106 B1 | 5/2008 | Bilski |
| 7,386,704 B2 | 6/2008 | Schulz et al. |
| 7,389,315 B1 | 6/2008 | Scott |
| 7,389,403 B1 | 6/2008 | Alpert et al. |
| 7,487,302 B2 | 2/2009 | Gouldey et al. |
| 7,545,809 B2 | 6/2009 | Engbersen et al. |
| 7,602,801 B2 | 10/2009 | Hayashi et al. |
| 7,623,539 B2 | 11/2009 | Isley |
| 7,715,437 B2 | 5/2010 | Denney et al. |
| 7,742,480 B2 | 6/2010 | Calvignac et al. |
| 7,826,486 B2 | 11/2010 | Calvignac et al. |
| 7,835,398 B2 | 11/2010 | Denney et al. |
| 7,839,852 B2 | 11/2010 | Liu et al. |
| 7,924,882 B2 | 4/2011 | Nagai et al. |
| 8,127,113 B1 | 2/2012 | Sinha et al. |
| 8,898,603 B1 * | 11/2014 | Neto .................. G06F 17/5036 716/106 |
| 2002/0026502 A1 | 2/2002 | Phillips et al. |
| 2002/0073375 A1 | 6/2002 | Hollander |
| 2002/0085551 A1 | 7/2002 | Tzeng |
| 2002/0091826 A1 | 7/2002 | Comeau et al. |
| 2002/0105910 A1 | 8/2002 | Maher, III et al. |
| 2002/0136211 A1 | 9/2002 | Battle et al. |
| 2002/0145974 A1 | 10/2002 | Saidi et al. |
| 2002/0161941 A1 | 10/2002 | Chue et al. |
| 2002/0163914 A1 | 11/2002 | Dooley |
| 2002/0163922 A1 | 11/2002 | Dooley et al. |
| 2002/0174279 A1 | 11/2002 | Wynne et al. |
| 2002/0174316 A1 | 11/2002 | Dale et al. |

(56) References Cited

U.S. PATENT DOCUMENTS

| | | |
|---|---|---|
| 2003/0031172 A1 | 2/2003 | Grinfeld |
| 2003/0079104 A1 | 4/2003 | Bethard |
| 2003/0086300 A1 | 5/2003 | Noyes et al. |
| 2003/0105617 A1 | 6/2003 | Cadambi et al. |
| 2003/0145155 A1 | 7/2003 | Wolrich et al. |
| 2003/0152078 A1 | 8/2003 | Henderson et al. |
| 2003/0152084 A1 | 8/2003 | Lee et al. |
| 2003/0161327 A1 | 8/2003 | Vlodavsky et al. |
| 2003/0177252 A1 | 9/2003 | Krichevski et al. |
| 2003/0188299 A1* | 10/2003 | Broughton .............. G06F 8/427 717/141 |
| 2003/0208723 A1 | 11/2003 | Killian et al. |
| 2003/0231634 A1 | 12/2003 | Henderson et al. |
| 2003/0233503 A1 | 12/2003 | Yang et al. |
| 2004/0004961 A1 | 1/2004 | Lakshmanamurthy et al. |
| 2004/0004964 A1 | 1/2004 | Lakshmanamurthy et al. |
| 2004/0037276 A1 | 2/2004 | Henderson et al. |
| 2004/0039891 A1 | 2/2004 | Leung et al. |
| 2004/0054837 A1 | 3/2004 | Biran et al. |
| 2004/0078767 A1* | 4/2004 | Burks .................. G06F 17/5045 716/113 |
| 2004/0083308 A1 | 4/2004 | Sebastian et al. |
| 2004/0098701 A1 | 5/2004 | Klein |
| 2004/0193733 A1 | 9/2004 | Vangal et al. |
| 2004/0193768 A1 | 9/2004 | Carnevale et al. |
| 2004/0194038 A1* | 9/2004 | Tamai .................. G06F 17/5045 716/104 |
| 2004/0205110 A1 | 10/2004 | Hinshaw |
| 2004/0258043 A1 | 12/2004 | Engbersen et al. |
| 2005/0013318 A1 | 1/2005 | Fike et al. |
| 2005/0027958 A1 | 2/2005 | Fuente et al. |
| 2005/0038946 A1 | 2/2005 | Borden |
| 2005/0080928 A1 | 4/2005 | Beverly et al. |
| 2005/0165985 A1 | 7/2005 | Vangal et al. |
| 2005/0188129 A1 | 8/2005 | Abdelilah et al. |
| 2005/0259672 A1 | 11/2005 | Eduri |
| 2005/0278502 A1 | 12/2005 | Hundley |
| 2006/0007862 A1 | 1/2006 | Sayeedi et al. |
| 2006/0039374 A1 | 2/2006 | Belz et al. |
| 2006/0056435 A1 | 3/2006 | Biran et al. |
| 2006/0112272 A1 | 5/2006 | Morioka et al. |
| 2006/0129767 A1 | 6/2006 | Berenyi et al. |
| 2006/0146808 A1 | 7/2006 | Campini et al. |
| 2006/0149921 A1 | 7/2006 | Lim |
| 2006/0221976 A1 | 10/2006 | Isley |
| 2006/0251120 A1 | 11/2006 | Arimilli et al. |
| 2006/0294149 A1 | 12/2006 | Seshadri et al. |
| 2007/0088932 A1 | 4/2007 | Bethard |
| 2007/0248075 A1 | 10/2007 | Liu et al. |
| 2008/0010390 A1 | 1/2008 | Abdelilah et al. |
| 2008/0013541 A1 | 1/2008 | Calvignac et al. |
| 2008/0072005 A1 | 3/2008 | Abdelilah et al. |
| 2008/0155135 A1 | 6/2008 | Garg et al. |
| 2008/0253398 A1 | 10/2008 | Calvignac et al. |
| 2009/0067429 A1 | 3/2009 | Nagai et al. |
| 2009/0296738 A1 | 12/2009 | Shimada |

FOREIGN PATENT DOCUMENTS

| | | |
|---|---|---|
| EP | 0365188 A2 | 4/1990 |
| EP | 0476628 A2 | 3/1992 |
| EP | 0489266 A2 | 6/1992 |
| EP | 0649085 A | 4/1995 |
| EP | 0871108 A1 | 10/1998 |
| GB | 2308470 A | 6/1997 |
| GB | 2309803 | 8/1997 |
| GB | 2330673 A | 4/1999 |
| WO | WO 97/13209 A1 | 4/1997 |
| WO | WO 00/70446 A2 | 11/2000 |
| WO | WO 00/70483 A2 | 11/2000 |

OTHER PUBLICATIONS

Synopsys, "SystemVerilog Verification Flow", Jun. 2005, p. 1-20.*

"Simulating Verilog RTL using Synopsys VCS", Feb. 16, 2006, p. 1-9.*

Altera, "Quartus II Simulation with Verilog Designs", Nov. 8, 2005, p. 1-16.*

"ARC Wins Key U.S. Patent," Microprocessor Report, Mar. 2005, pp. 19-20, vol. 19, Archive 3.

Baron, M. "Arm's Configurable OptimoDE," Microprocessor Report, Jun. 2004, pp. 10-14, vol. 18, Archive 6.

Clucas, R., "Designing with a Customisable Miscroprocessor Core," Electronic Eng'g, vol. 71, No. 865, Feb. 1, 1999, p. 35.

"Condition Register Coherency Look-Ahead," Research Disclosure (1993), No. 348, Apr. 1993, p. 243, XP000304185.

Diefendorff, K. et al., "Organization of the Motorola 88110 Superscalar RISC Microprocessor," IEEE Micro, Apr. 1992, pp. 40-63, vol. 12, No. 2.

Ditzel, D.R., et al., "Branch Folding in the CRISP Microprocessor: Reducing Branch Delay to Zero," 14th Annual International Symposium on Computer Architecture, Jun. 2-5, 1987, pp. 2-8, XP000212073.

Halfhill, T.R., "Altera's New CPU for FPGAs" Microprocessor Report, Jun. 2004, pp. 15-20.

Halfhill, T.R. et al., "ARC Patent Looks Formidable," Microprocessor Report, Aug. 2005, pp. 3-11, vol. 19, Archive 8.

Halfhill I, T.R., "ARC's Preconfigured Cores," Microprocessor Report, Mar. 2005, pp. 15-20, vol. 19, Archive 3.

Halfhill, T.R., "Busy Bees at Silicon Hive" Microprocessor Report, Jun. 2005, pp. 17-20, vol. 19, Archive 6.

Halfhill, T.R., "MIPS Embraces Configurable Technology" Microprocessor Report, Mar. 2003, pp. 7-15, vol. 17, Archive 3.

Halfhill, T.R., "Tensilica Patent Challenged," Microprocessor Report, Jun. 2003, p. 4, vol. 17, Archive 6.

Halfhill, T.R. et al., "Tensilica Patents Raise Eyebrows," Microprocessor Report, Dec. 2002, pp. 1, 7-10, vol. 16, Archive 12.

Halfhill, T.R., "Tensilica's Automaton Arrives," Microprocessor Report, Jul. 2004, pp. 22-26.

Hartoog et al., "Generation of Software Tools from Processor Descriptions for Hardware/Software Codesign," ACM, Jun. 1997, pp. 303-306.

"HDL Chip Design" by Douglas J. Smith, Ninth printing Jul. 2001, minor updates. First Printing Jun. 1996. Doone Publications. ISBN 0-9651934-3-8. pp. 1-25.

Helbig, W. et al., "A DCFL E/D MESFET GaAS Experimental RISC Machine," IEEE Transactions on Computers, Feb. 1989, pp. 263-274, vol. 38, No. 2.

Hogl, H. et al., "Enable + +: A General-Purpose L2 Trigger Processor," Nuclear Science Symp. & Medical Imaging Conf., vol. 2, Oct. 21-28, 1995, pp. 667-671.

Leupers, R. et al., Retargetable Code Generation based on Structural Processor Descriptions, Design Automation for Embedded Systems, vol. 3, No. 1, Jan. 1998, p. 1-36.

May, D. et al., "The Transputer," Proceedings of the NATO Advanced Workshop on Neural Computers, Berlin, DE, Sep. 28-Oct. 2, 1987, pp. 477-486.

Warren, H.S., "Instruction Scheduling for the IBM RISC System/6000 Processor," IBM Journal of Research and Development, vol. 34, No. 1, 1990, pp. 85-92, XP000128183.

Wirthlin et al., "The Nano Processor: a Low Resource Reconfigurable Processor," IEEE Workshop on FPGAs for Custom Computing Machines, Napa, CA, Apr. 11, 1994, pp. 23-30.

Wollan, V., "A Design Methodology Achieving Fast Development Cycles for Complex VLSI Architectures," Proc. on the European Conf. on Design Automation, Feb. 22-Mar. 25, 1993, pp. 532-535.

Yang, Jin-Hyuk, et al. "MetaCore: A Configurable & Instruction-Level Extensible DSP Core." Proceedings of the ASP-DAC '98 Asian and South Pacific Design Automation Conference 1998, Feb. 1998, pp. 325-326, XP-OO2137268.

United States Office Action, U.S. Appl. No. 11/607,452, Oct. 19, 2011, 15 pages.

United States Office Action, U.S. Appl. No. 11/607,452, Apr. 11, 2011, 19 pages.

United States Office Action, U.S. Appl. No. 11/607,452, May 20, 2010, 20 pages.

(56) References Cited

OTHER PUBLICATIONS

United States Office Action, U.S. Appl. No. 11/607,452, Sep. 17, 2009, 16 pages.

* cited by examiner

HARDWARE ACCELERATOR TEST HARNESS GENERATION

RELATED APPLICATIONS

This application is a continuation of U.S. application Ser. No. 13/358,407, filed on Jan. 25, 2012, entitled "Generating Hardware Accelerators and Processor Offloads", now issued as U.S. Pat. No. 9,003,166, which is a divisional application of U.S. application Ser. No. 11/607,452, filed on Dec. 1, 2006, entitled "Generating Hardware Accelerators and Processor Offloads", now issued U.S. Pat. No. 8,127,113. This application is related to U.S. application Ser. No. 11/607,474, filed on Dec. 1 2006, entitled "Structured Block Transfer Module, System Architecture, and Method For Transferring", now U.S. Pat. No. 8,706,987; U.S. application Ser. No. 11/607,481, filed on Dec. 1 2006, entitled "System and Method For Managing Abstract Objects In Memory"; and U.S. application Ser. No. 11/607,429, filed on Dec. 1 2006, entitled "Packet Ingress/Egress Block And System And Method For Receiving, Transmitting, And Managing Packetized Data", now U.S. Pat. No. 8,289,966; each of which are hereby incorporated by reference in their entirety.

FIELD OF THE INVENTION

This invention pertains to systems, devices, methods for hardware acceleration of software processes, and more particularly to computer implemented systems and methods for automatically generating a design for one or more hardware accelerators and for offloading processes from a processor to a hardware accelerator.

BACKGROUND OF THE INVENTION

Conventionally, where most system and system processing functionality flexibility is needed, system functionality will be written in software for implementation or execution in some type of general purpose processor so that such functionality can be easily modified or updated as needed. Furthermore, especially for systems implementing a wide variety of possible processing functions, using a single processor to execute a wide variety of behaviors may typically use less hardware resource than if dedicated hardware circuits or devices were created for each and every one of those functional behaviors.

However, system or device functionality executed in software and executed in some general purpose processor or logic will typically be slower than if that same functionality were implemented and executed in hardware dedicated to the particular function. Therefore, for certain performance-critical functions or where high speed or throughput are desired, selective hardware accelerators (also called variously co-processors, accelerators, and/or offloads, depending on the specifics of their configurations) may be used in conjunction with, and under the direction of, processors executing software or other control means. These co-processors, accelerators, and/or offloads are included within the class of hardware that will be referred to as accelerators in the remainder of this description.

Most conventional hardware accelerators are manually designed in conjunction with computerized design and optimization tools, meaning that a hardware engineer determines the required functionality and utilizes computerized design and optimization tools to realize that functionality. Some techniques have been used to design hardware accelerators automatically, but such completely automated designs almost invariably have certain limitations and inefficiencies.

There therefore remains a need for hardware accelerator design tools and methods that permit relaxation of some of the limitations of the conventional tools and methods and that increase implementation efficiency using an improved hardware model.

We first consider a typical standard hardware model. To date the industry has developed two basic classes of system for creating hardware out of software. The difference primarily relates to whether or not the software description is "timed" or "untimed", or using alternative terminology, whether it is "sequential" or "parallel."

Typical software written for typical computers is sequential in nature. This means that each instruction is intended to be executed after the prior instruction. There is never an expectation that two instructions might be executed at the same time or out of order. Though there are some speculative or out-of-order processors and processing schemes available, these typically operate by generating one or more possible results in the anticipation of a specific program flow. But the only result that is made final and permanent is the one that is explicitly consistent with sequential processing such that there would be no external way to determine whether or not such speculative or out-of-order implementation had occurred. In addition, the software writer typically has no concept of the underlying execution timing, in terms of when various portions of the calculation occur with respect to others or with respect to a system clock. From this standpoint, the software is untimed, and the sequential nature ensures that calculations happen in a controlled and predictable fashion.

Typical hardware designs, by contrast, allow multiple calculations to occur in parallel. In addition, the timing of each calculation is critical, since interdependencies between different portions of the data and the parallel nature of calculation make it critical that the correct data appear for manipulation at the correct time in order to ensure the correct result.

The first type of converter places the responsibility on the designer for taking untimed sequential software and changing it to express which items can be calculated or processed in parallel as well as other timing dependencies. Computer program code so annotated and restructured can look quite different from the original untimed sequential computer program code, and thus may represent a significant burden on the designer.

The second type of converter handles parallelization and timing automatically. But these systems convert entire programs from, in theory, broad ranges of application. As such they are typically very complex and expensive. The complexity accrues not only to the development of the tool, but also to the usage in that there are many variables over which the user has control and which affect the output. In addition, practical results from such programs suggest that for certain kinds of mathematically or computationally intense but sequentially simple programs, adequate results can be obtained. But for programs with more complicated flows, including those having numerous branching conditions, results can be extremely large and inefficient.

When the goal is the simple offloading or acceleration of a well-defined function from a larger program, neither of these approaches has heretofore been adequate. The first type of converter requires too much work on the part of the designer, and really requires the software programmer to think like a hardware designer. The second type of converter solves too large a problem, and is impractical for use for simple function offloading or acceleration. In addition, for some application spaces like network protocol implementation, the results are inefficient to the point of unusability.

There clearly remains, then, a need for a simple efficient low-effort tool for creating function offloads.

Attention is next directed to synchronous versus asynchronous behavior. There are two broad classes of accelerator that determine the timing characteristics of the interaction between the general purpose processor executing software and the one or more hardware accelerators that might be utilized as a substitute or as an additional processing resource for particular processing functionality.

A synchronous accelerator may be invoked by the processor, and while such synchronous accelerator operates on the task assigned, the processor waits for the accelerator to complete the task. The processor resumes activity once the synchronous accelerator has finished.

FIG. 1 is an illustration showing an example of this type of offload or acceleration. It shows a Processor 100 connected to a synchronous Accelerator 110. The execution of Processor 100 and Accelerator 110 are indicated by waveforms, with a 'high' level indicating activity and a 'low' level indicating idle or no activity. When Accelerator 110 becomes active (Step 140), Processor 100 becomes inactive (Step 130). Processor 100 activity does not resume (Step 150) until Accelerator 110 completes its activity (Step 160).

This type of accelerator is common and can operate with almost any standard commercial processor, as long as the processor has some facility for connecting to and invoking the synchronous accelerator. The disadvantage of this configuration is that while the accelerator executes, processor execution stalls until the accelerator completes its task.

An asynchronous accelerator is invoked by the processor, but while the asynchronous accelerator operates on the task assigned, the processor continues working on some other task in parallel with the asynchronous accelerator. It is possible that such parallel processing might be execution of computer program software code from the same process as that which invoked the accelerator, but this is really a semi-synchronous behavior since at some point in the execution of the code by the processor the result of the hardware accelerator will be needed, and if the processor completes its simultaneous processing before the accelerator completes, the processor will be forced to wait until the hardware accelerator is finished, just as with the synchronous case. FIG. 2 illustrates this case. In the example of FIG. 2, Processor 200 is connected to semi-synchronous Accelerator 210. When Accelerator 210 starts execution (Step 250), Processor 200 continues execution (Step 230) until it needs the result from Accelerator 210, at which point Processor 200 goes idle (Step 240). Processor 200 resumes (Step 250) once Accelerator 210 completes (Step 270).

The only truly asynchronous case is one where the processor can continue with execution of its own computer code irrespective of the progress of the hardware accelerator. FIG. 3 illustrates asynchronous Accelerator 310 connected to Processor 300. Processor 300 can execute multiple threads either by virtue of hardware threading or operating system threading. It has at least two threads, and Thread 1 requires the use of Accelerator 310. When Accelerator 310 is invoked (Step 330), Accelerator 310 starts executing (Step 350), and Processor 300 starts executing the second thread (Step 340). Processor 300 only resumes executing Thread 1 (Step 360) once Accelerator 310 is finished (Step 380) and Processor 300 has finished with Thread 2 (Step 370).

Asynchronous offloading has usually only been possible with multi-threaded processors, since such multi-threaded processors can swap threads after accelerator invocation, and then pick up the old thread once the accelerator is finished. Single-threaded processors can operate in a multi-threaded manner with the assistance of an operating system to implement multi-threading. But the use of such operating systems impairs the performance of the processor, and processes that push the performance limits of contemporary processors typically operate without the burden of the kind of operating system that could implement multi-threading. Therefore true asynchronous accelerators have not been possible with processors with which multi-threading is either not possible or not practical.

Other schemes have been used where the result of an offload can be rescheduled by a global rescheduler, whose role it is to schedule tasks onto various possible processors. This can have an effect similar to the desired asynchronous behavior described above, except that such schemes typically schedule for all processors together, so very often the result of the offload will not return to the same processor that scheduled the offload. The scheduler is also not tightly coupled to a given processor since it schedules for all processors. Therefore there is more delay in delivering the offload result back to a processor because of all of the other scheduling and the likely further physical proximity of the scheduler to the processor.

Therefore, there remains a need for a means of realizing asynchronous offloading in a manner that is guaranteed to keep the result of the offloading with the original processor.

Another problem or limitation in convention systems and methods pertains to the accelerator connection. Processors typically access their accelerators via any of the many kinds of bus that allow modeling of accelerators as an extended instruction set, inserting access to the buses into the instruction fetch pipeline of the processor. FIG. 4 illustrates a typical Processor 400 connected to a number of Accelerators 420 by a Bus 410.

Such a bus provides a convenient shared means of the processor accessing multiple accelerators if needed. But connecting processors and accelerators over a bus using this scheme has at least two fundamental limitations. The first limitation is that all accesses to the accelerators must be arbitrated using some bus access arbitration scheme, and communication can only occur with one accelerator at a time over the shared bus. The second limitation is that with the use of multi-core processors, the use of a single shared bus would be expected to slow the access of all processors to their offloads or accelerators. FIG. 5 shows a typical system with several Processors 500 all having access to multiple Accelerators 520 via shared Bus 510. This is particularly problematic if the bus used is the system bus, since access to offloads is further encumbered by the processor's need to communicate with memories and other elements on the system bus. But even if a separate bus is created for all of the offloads, the bandwidth relief is marginal since all offloads are still contending with each other, and even uncontended access requires the time for bus arbitration.

The sharing could possibly be eliminated by giving each processor access to its own private set of accelerators. The use of private accelerators simply for overcoming the limitations of a bus is resource-intensive due to the number of busses and the replication of accelerators. FIG. 6 is an example of a system having a series of Processor/Accelerator units 600, each of which has a Processor 610 and a series of Accelerators 630, interconnected by a Bus 620.

In addition, busses are almost always lower-performance than point-to-point connections, at least in terms of the amount of time it takes or bandwidth consumed to access the hardware accelerator, because of the overhead required for bus arbitration. FIG. 7 is an illustration showing typical delay, and in particular shows the timing for two Accelerators trying to get access to the same bus, for example, in order to return a result. In this and subsequent such drawings, a low level means idle; a high level means active; and a middle level indicates awaiting access. Accelerator 1 requests access first and waits for a grant (Step 700). Once granted access it starts execution (Step 710). Accelerator 2 also requests access afterwards, but has to wait not only for the arbitration to occur, but also for Accelerator 1 to finish. So Accelerator 2 has to wait (Step 730) until Accelerator 1 has finished (Step 720) before it can be granted access (Step 740). The entire time consumed by both accelerators is the grant time for Accelerator 1 (delay 750) plus the wait and grant times for Accelerator 2 (delays 760 and 770).

The added delay or reduced bandwidth due to arbitration gets rapidly worse if additional offloads are added to the system, and the penalty increases out of proportion to the number of offloads added. This makes such a system not scalable, in the sense that adding additional offloads will bog the system down to the point of making it unusable. There remains a need for an offloading methodology that allows the connection of any number of offloads without a disproportionate reduction in bandwidth. There also remains a need for an offloading methodology and system that are scalable.

Accelerator task scheduling methodologies in convention systems impose additional limitations. Typically, processors send individual tasks to accelerators. For an asynchronous accelerator offload, it is possible that while an accelerator is executing and the processor is executing a different thread (with some task and thread tagging or other suitable mechanism that allows task/thread coherency to be maintained), that processor thread may require the use of the accelerator. In this case, the processor has to stop and wait until the accelerator is free before scheduling the next task. This can slow the overall performance of the system due to processor wait time. This is illustrated in the example of FIG. 8, where Thread 1 has been offloaded to an Accelerator while the Processor executes Thread 2. Accelerator execution is underway (Step 820), as is Processor execution (Step 800). At some point during the execution the Processor needs access to the Accelerator, but the Accelerator is busy and therefore the Processor has to wait (Step 840). Once the Accelerator has finished its task (Step 830) the Processor can issue its Accelerator invocation (Step 810) and the Accelerator can start on the new task (Step 850). The delay incurred is indicated by delay 860.

Test harness creation may also be problematic for conventional systems and methods. A significant element of the design of any circuit is the ability to validate the correct functioning of the circuit. This is typically done through the manual creation of an environment for providing stimulus of the circuit and observation of the resulting behavior of the circuit under test. The resulting observed behavior is compared with expected correct behavior to validate the correctness of the circuit. This environment is referred to as a test harness or test bench.

FIG. 9 illustrates a typical Test Harness 940 which comprises a Pre-Conditioner 900, a Stimulus Generator 960, and a Response Analyzer 950. Test Harness 940 is connected to a System Under Test 930.

The basic testing procedure of a typical system is shown in FIG. 10. First the System Under Test 930 is powered up and initialized (Step 1000). Then any conditions that have to be established for a specific test are applied by Pre-Conditioner 900 (Step 1010). Then the test is initiated by issuing a stimulus by Stimulus Generator 960 (Step 1020), and capturing and analyzing the response of System Under Test 930 to those stimuli using Response Analyzer 950 (Step 1030).

Even circuits that are automatically created from software are advantageously validated, since there can be errors in the original software that was converted, unexpected behavior can occur when sequential behavior is made concurrent, and there may even be bugs or errors in the converting software. Even though the circuit itself is automatically created, the user would typically manually create a test harness for validating the circuit. This process is time-consuming and error-prone.

In addition, conversion from a software language to a hardware language is usually only possible if a direct equivalency can be proven between the software language constructs and the resulting hardware language constructs given the conversion algorithm. Such equivalency can usually only be proven through simulation if the simulation environment reflects an accurate (including cycle-accurate) model of the environment in which the offload will exist. Unit testing using the standard model, such as that illustrated by FIG. 9, does not reflect such an environment. Manual creation of such environments in an ad-hoc manner are possible, but there remains a need for an automated structured approach to the generation of a test environment for proving equivalence.

A test case must also usually be created. Once a test harness is in place, various tests can be executed to validate circuit behavior. These tests are typically hand-written by the user. Even in the case of an automatically-generated circuit, the tests are hand-written. This process is time-consuming and error-prone.

An additional requirement for a designer, having created an offload by some means or method, is that the software program containing the function that has been rendered in hardware have a means to invoke the newly-generated accelerator. In simplest terms, the function call must be replaced by an offload invocation. This can be cumbersome and error prone since there are a number of steps that must be taken to ensure that parameters are correctly enqueued, that global variables are accessible, and that the offload results are correctly dequeued. While these steps can execute quickly in hardware, they represent a level of effort best avoided for the designer.

From the above description, it will be apparent that conventional systems, methods, and design approaches have considerable limitations, and that there remains a need for hardware accelerator design tools and methods that permit relaxation of some of the limitations of the conventional tools and methods and that increase implementation efficiency using an improved hardware model, reduce the amount of bandwidth required to execute the offloaded function, as well as a need for a simple efficient low-effort computer implemented automated tool for creating function offloads and their invocation and validation, as well as a need for a means of realizing asynchronous offloading in a manner that is guaranteed to track and keep the result of the offloading with the original processor. These and other problems and limitations are solved and overcome by the various embodiments of the invention described herein.

SUMMARY OF THE INVENTION

In one aspect, the invention provides system and method for generating hardware accelerators and processor offloads.

In another aspect, the invention provides a system for hardware acceleration comprising: a parameter queue; a result queue; a host port; and a logic block.

In another aspect, the invention provides a system for implementing an asynchronous offload, the system comprising: a hardware accelerator, a processor; and a queue data structure coupled to the hardware accelerator and to the processor, that receives an input that is an output from the hardware accelerator, and that generates an output that in an input to the processor.

In another aspect, the invention provides a method of automatically creating a hardware accelerator comprising: creating a logic for fetching parameters; creating a logic for updating return values; creating local variable registers; and creating an internal offload logic.

In another aspect, the invention provides a computer program stored on a computer-readable media and including instructions for performing a method of automatically creating a hardware accelerator, the method comprising: creating a logic for fetching parameters; creating a logic for updating return values; creating local variable registers; and creating an internal offload logic.

In another aspect, the invention provides a computerized method for automatically creating a test harness for a hardware accelerator from a software program, the method comprising: creating a first set of instructions to provide input parameters to the hardware accelerator under test during the test; creating a second set of instructions to clock the hardware accelerator under test during the test for the number of cycles required to complete processing; and creating a third set of instructions to extract at least one output result value from the hardware accelerator under test during the test.

In another aspect, the invention provides a system for interconnecting hardware accelerators and processors, the system comprising: a processor; a plurality of hardware accelerators; each of the plurality of hardware accelerators being connected to the processor by its own point-to-point connection.

In another aspect, the invention provides a system for interconnecting a processor and a hardware accelerator comprising: a processor having an output; a hardware accelerator having an input; a queue; and the queue being connected between the output of the processor and the input of the hardware accelerator.

In another aspect, the invention provides a computer implemented method of generating a hardware circuit logic block design for a hardware accelerator automatically from software, the method comprising: creating a logic block, the logic block adapted for: (i) receiving parameters from a queue; (ii) sending its result values to a queue; (iii) accessing global variables via a global map; and (iv) accessing local variables via a local memory port.

In another aspect, the invention provides a computer program stored on a computer-readable media and including instructions for performing a computer implemented method of generating a hardware circuit logic block design for a hardware accelerator automatically from software, the method comprising: creating a logic block, the logic block including logic elements for: (i) receiving parameters from a queue; (ii) sending its result values to a queue; (iii) accessing global variables via a global map; and (iv) accessing private variables via a pointer port.

In another aspect, the invention provides a computer program stored on a computer-readable media and including instructions for performing a computer implemented method of creating a test harness for a hardware accelerator from a software program, the method comprising: creating a first set of instructions to provide input parameters to the hardware accelerator under test during the test; creating a second set of instructions to clock the hardware accelerator under test during the test for the number of cycles required to complete processing; and creating a third set of instructions to extract at least one output result value from the hardware accelerator under test during the test.

In another aspect, the invention provides a method and computer program for invocation of an offload.

In another aspect, the invention provides a method and computer program for generating computer program code that executes the invocation method and process.

In another aspect the invention provides computer program and computer program product stored on tangible media implementing the methods and procedures of the invention.

DETAILED DESCRIPTION OF EXEMPLARY
EMBODIMENTS OF THE INVENTION

This invention provides a means of creating a hardware offload and hardware acceleration from a software function. Exemplary embodiments of the invention provide some or all of the following features and characteristics, some of which may be optional: (1) generates a hardware offload from an untimed function definition, (2) allows asynchronous accelerators for use with single-threaded processors, (3) allows point-to-point connection of accelerators to processors, (4) allows the queuing of accelerator tasks, (5) automatically creates a test harness for testing the created hardware accelerator, and/or (6) automatically creates one or more test cases of the created hardware accelerator for use in an automatically created cycle-accurate test environment.

Figure 1:
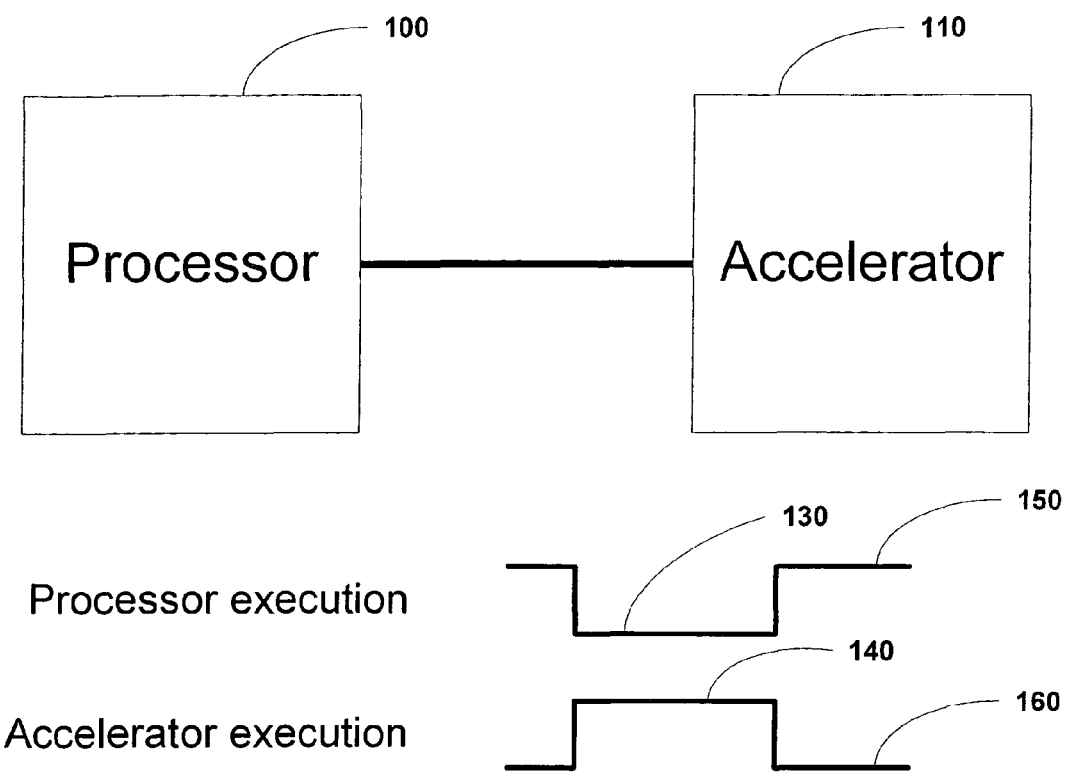
FIG. 1 shows a typical basic synchronous processor/accelerator system and timing.
Figure 2:
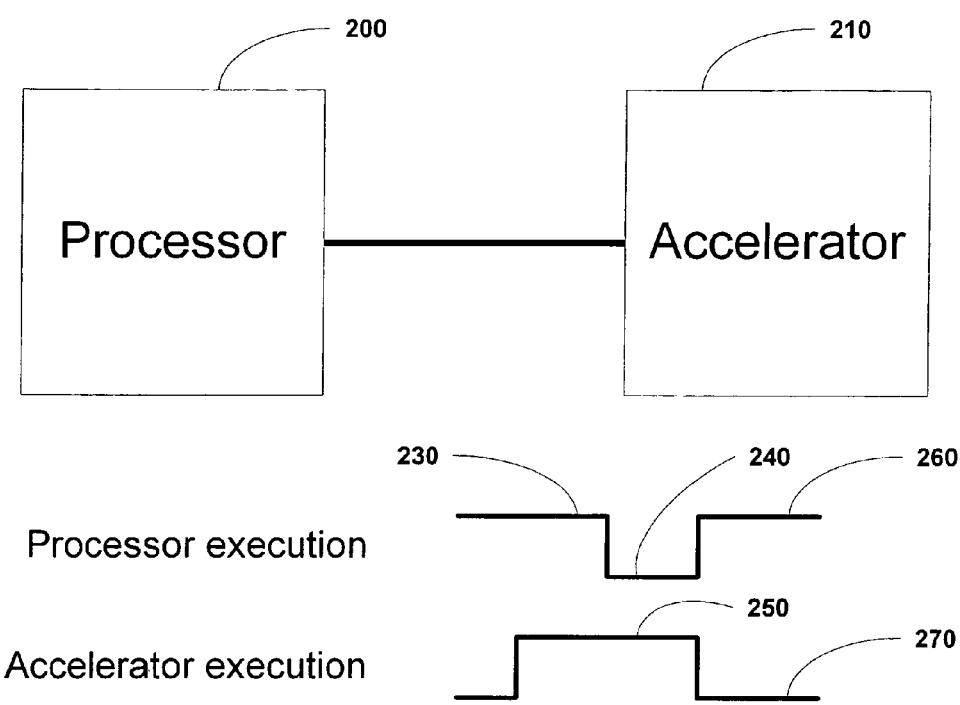
FIG. 2 shows a similar typical semi-synchronous system and timing.
Figure 3:
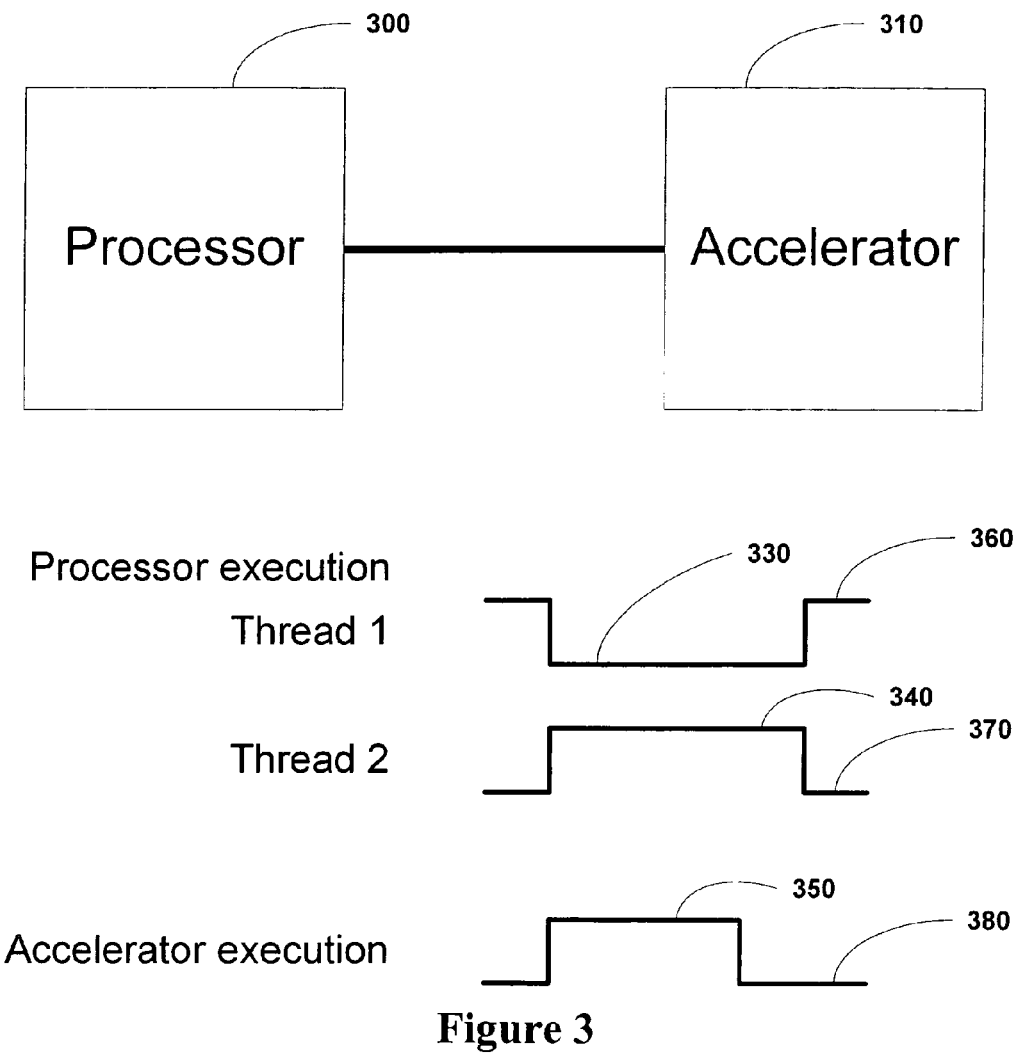
FIG. 3 shows a similar typical asynchronous system and timing.
Figure 4:
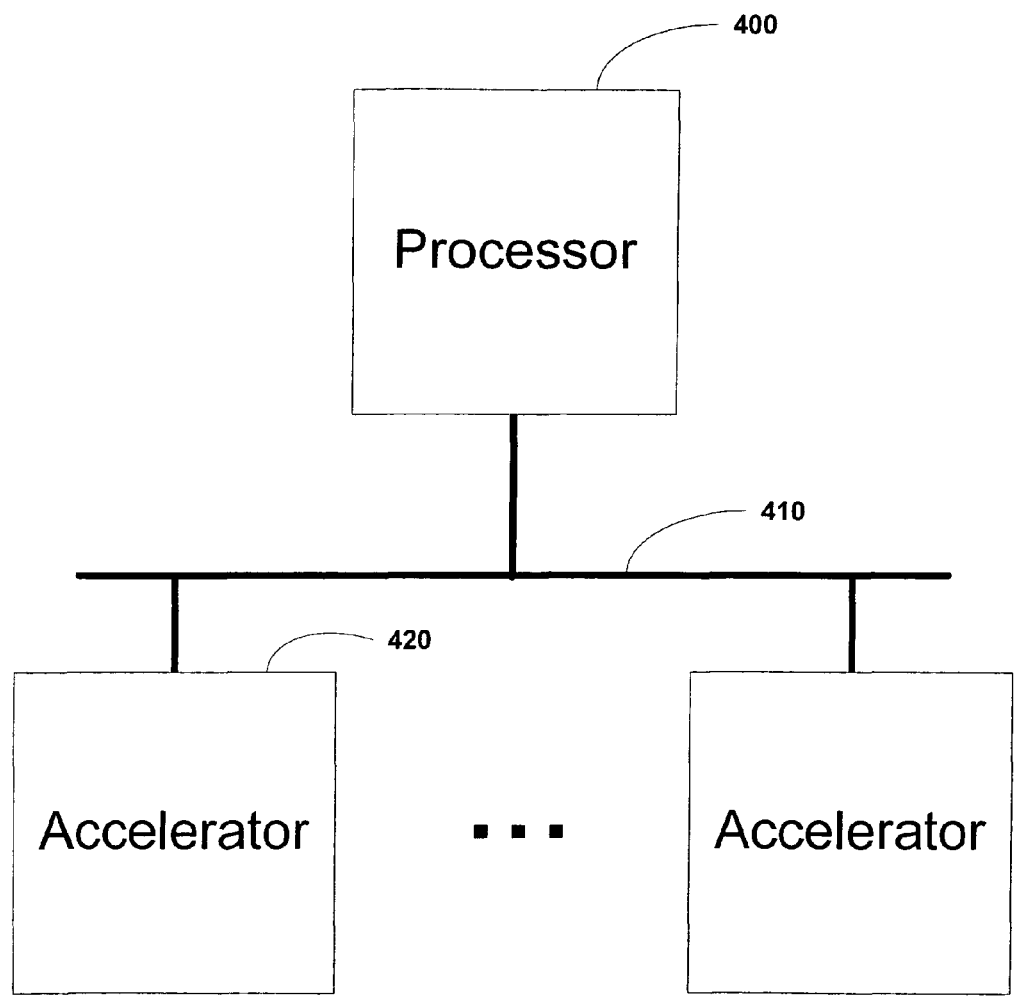
FIG. 4 shows typical accelerators connected to a single processor by a shared bus.
Figure 5:
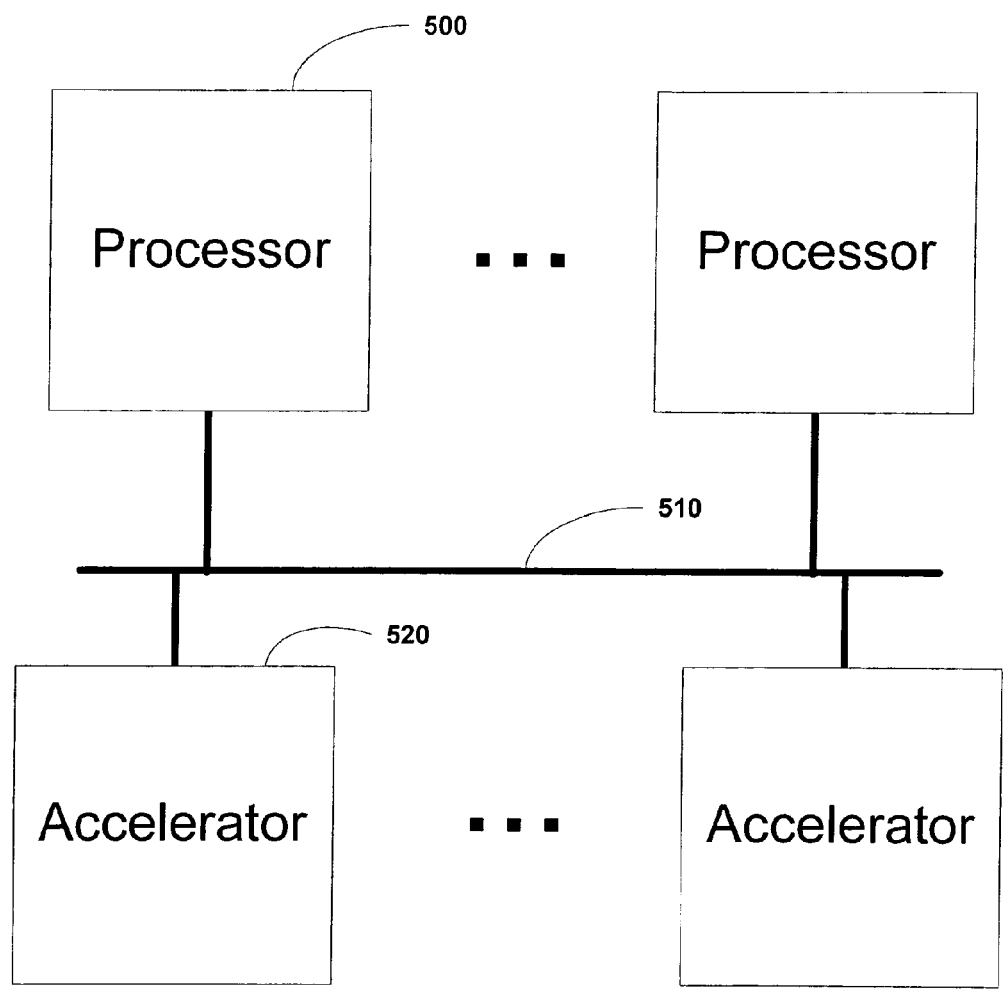
FIG. 5 shows typical accelerators connected to multiple processors by a shared bus.
Figure 6:
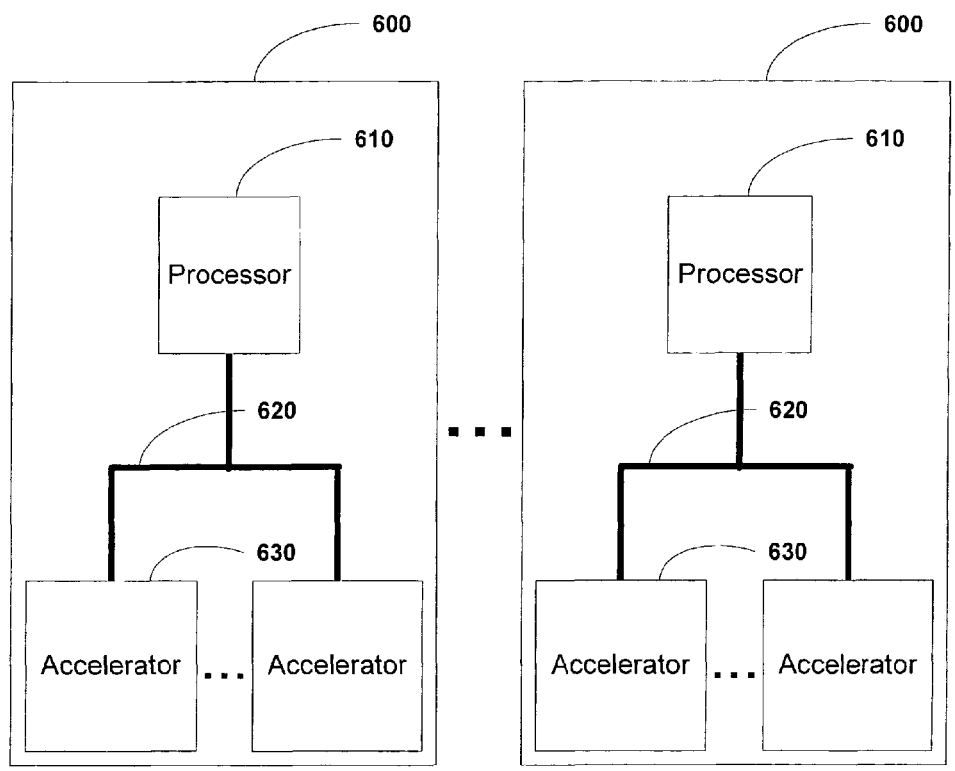
FIG. 6 shows typical multiple processors each with an individual set of accelerators.
Figure 7:
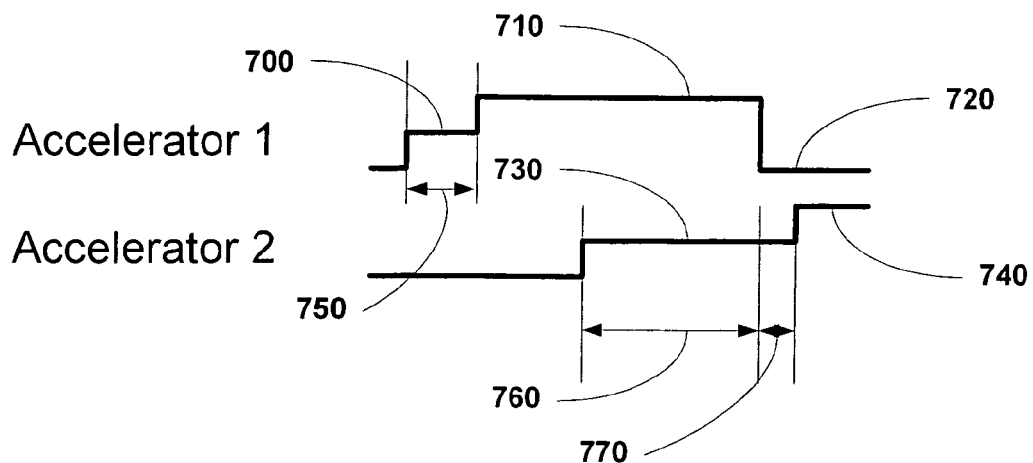
FIG. 7 shows the timing involved in a typical shared bus on which two accelerators reside.
Figure 8:
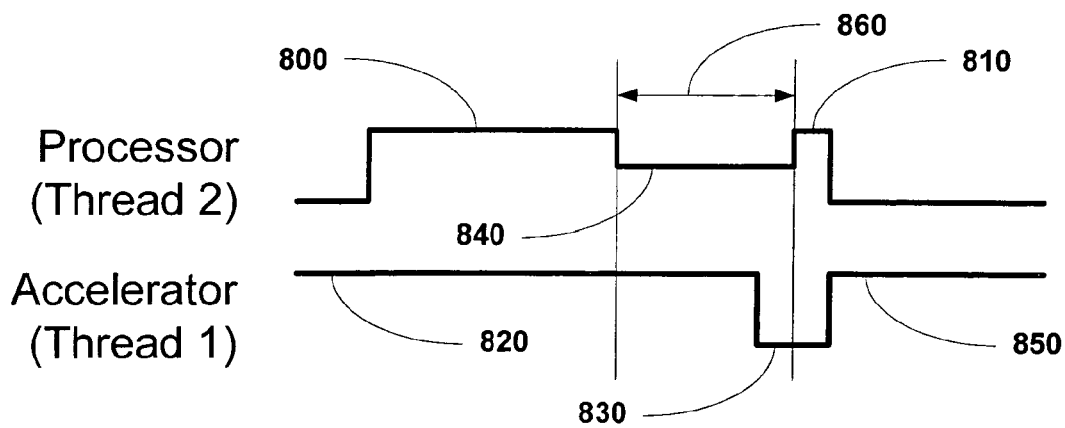
FIG. 8 shows the typical timing involved when a processor needs to assign a task to a busy accelerator.
Figure 9:
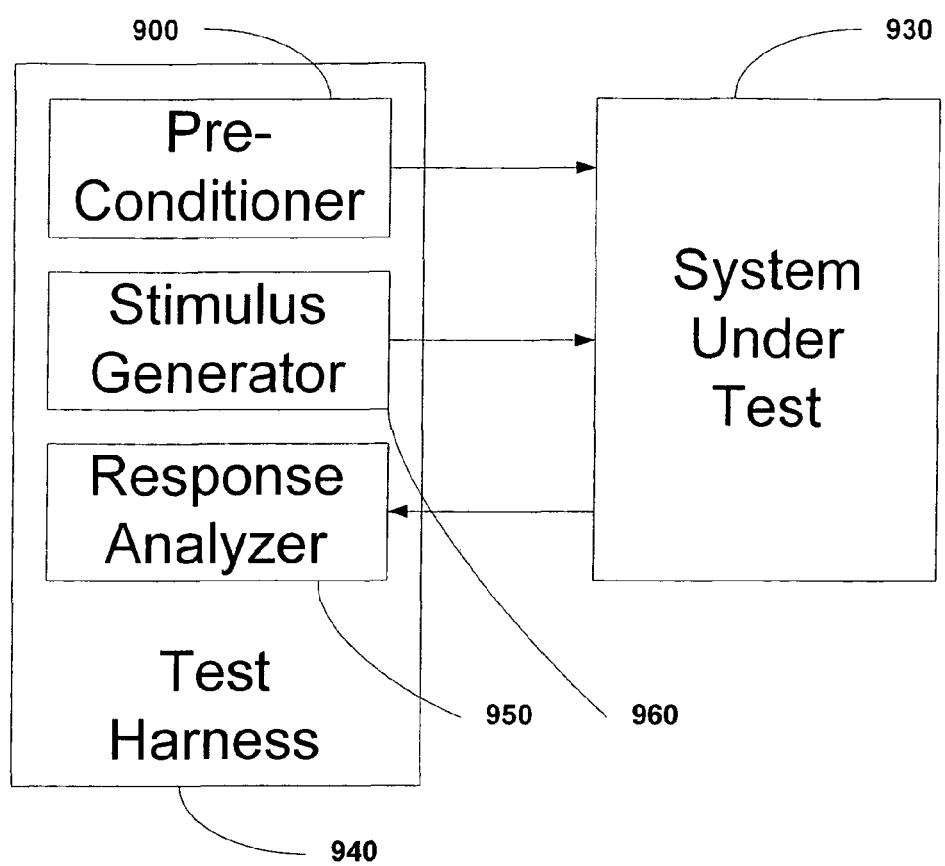
FIG. 9 shows a typical test system.
Figure 10:
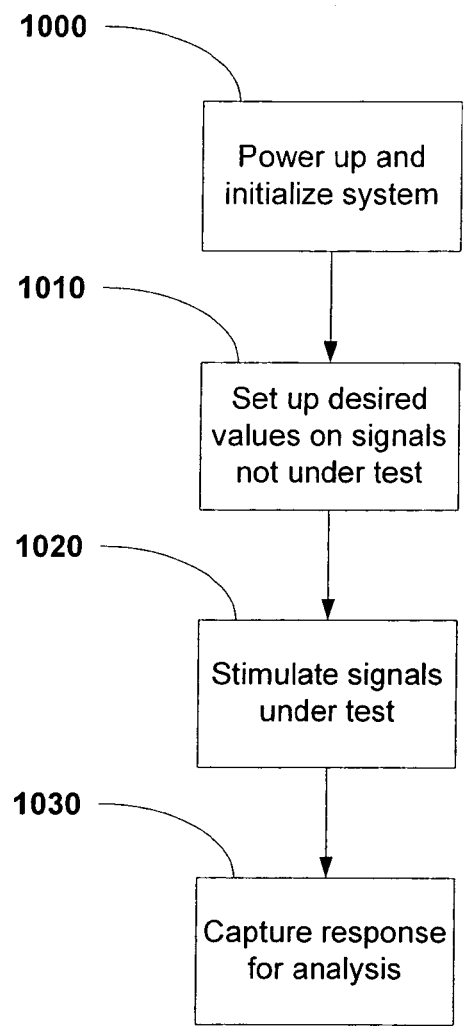
FIG. 10 shows a typical process for executing a test sequence.
Figure 11:
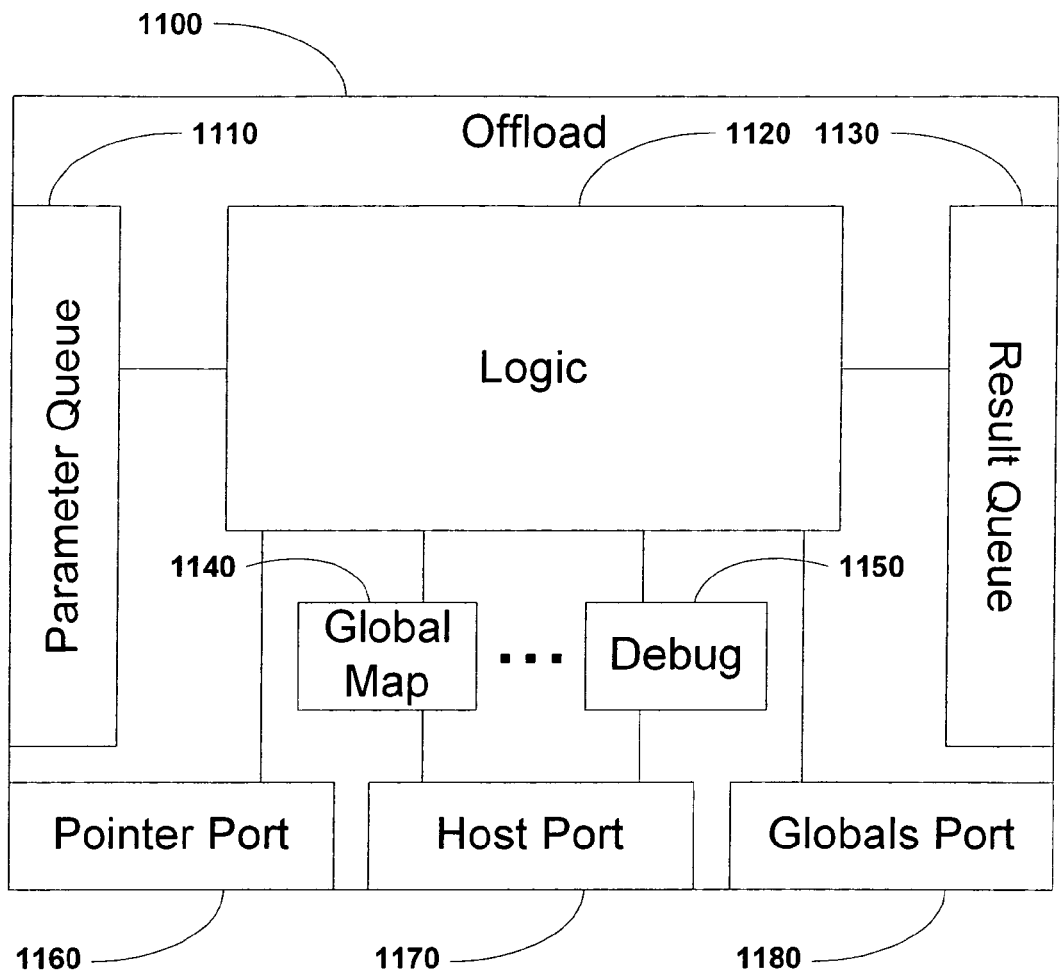
FIG. 11 shows an exemplary embodiment of an architecture for an automatically-generated hardware accelerator.

FIG. 11 provides a block diagram of an exemplary non-limiting embodiment of an aspect of the invention. This embodiment has been realized or implemented in an Field Programmable Gate Array (FPGA) using MicroBlaze processors to invoke the accelerator, but the invention isn't limited to FPGAs or to any other particular implementation, but may be implemented in any suitable fashion including ASIC, or SoC, or by other electronic circuits and/or logic. In addition, the applicability is not limited to utilization with MicroBlaze™ processors, but may also or alternatively be used with Nios™, Mico32™, or any other suitable processor. In this figure, Offload 1100 includes a Parameter Queue 1110, a Logic block 1120, a Result Queue 1130, a Global Map 1140 that may contain the locations of all required global variables, an optional Debug block 1150 that may contain registers for debug access, a Pointer Port 1160 that may provide access to the invoking processor's private local memory, a Globals Port 1180 that may provide access to shared global memory, and a Host Port 1170, through which a host processor or the invoking processor may access Offload 1100 and provide such services as initialization of Global Map 1140 or reading Debug block 1150. Note that there are other optional services that may be provided through the Host Port 1170 besides global address mapping and debugging, as indicated by the ellipsis in the drawing. Which specific services are accessible by the Host Port 1170 is not critical to the invention.

One way of using this exemplary arrangement is that the invoking processor will push function parameters (also known as arguments) into Parameter Queue 1110. The logic may then pull the parameters off the queue and process or operate on them, fetching memory elements in the private context memory via Pointer Port 1160 as needed, using the Global Map 1140 to access global variables via Globals Port 1180 as needed, and reading or updating registers in Debug block 1150 as appropriate.

Figure 12:
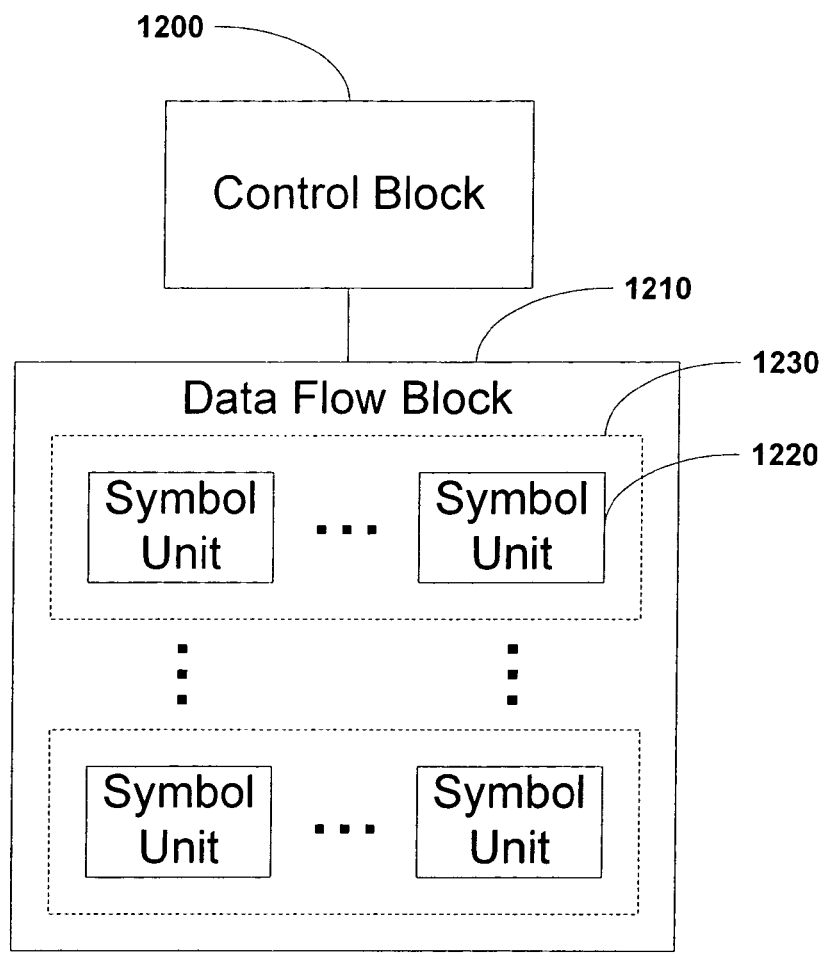
FIG. 12 shows an exemplary embodiment of a block diagram of the logic portion of an automatically-generated hardware accelerator.

Logic Block 1120 may further be divided into a Control Block 1200 and a Data Flow Block 1210, as shown in the exemplary embodiment of FIG. 12. Data Flow Block 1210 may take care of the calculation of values, some of which may be returned at the end of the offloaded process, and may comprise a number of Symbol Units 1220 grouped into Segment Groups 1230. Each Segment Group 1230 corresponds to a code segment such as will be described below. Control Block 1200 may control which calculations are undertaken, and in which order they are to be undertaken. This structure will allow an automatic accelerator generator to divide a program into data flow and control elements, generating data flow logic in the data flow block, and control logic in the control block.

Figure 13:
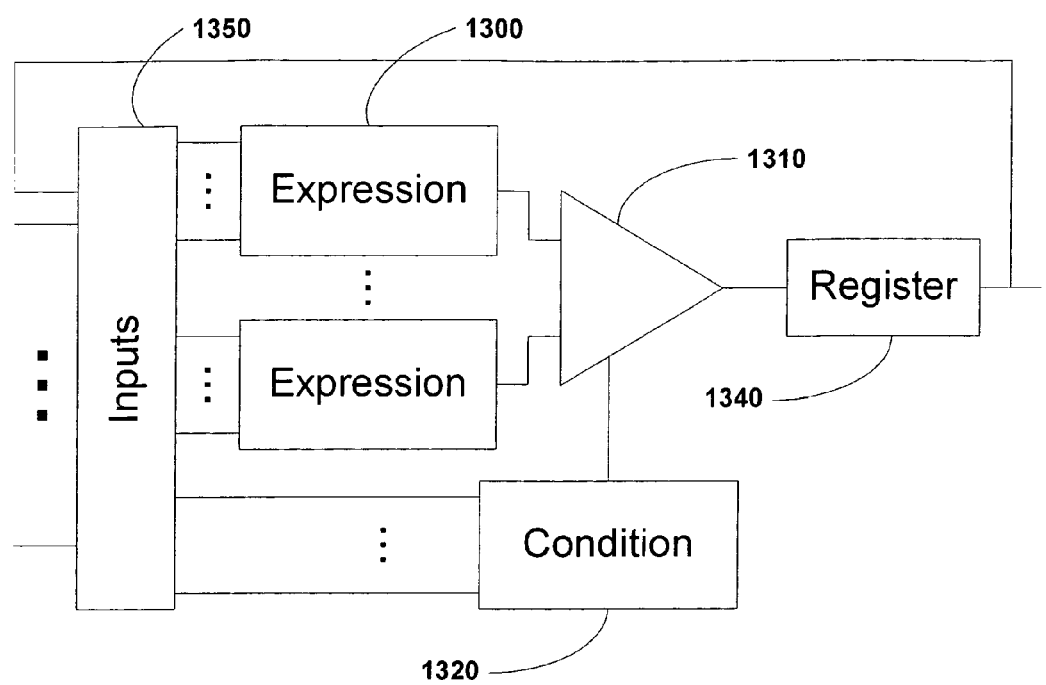
FIG. 13 shows an exemplary embodiment of an architecture for a Symbol Unit.

A possible embodiment of Symbol Unit 1220 is illustrated in the exemplary embodiment of FIG. 13. Here a series of Expression 1300 are fed or communicated into Multiplexer 1310; and one of the Expressions 1300 is selected based on the value of Condition 1320 and is fed into Register 1340. The Inputs 1350 used to feed Expressions 1300 and Condition 1320 may be symbols, signals from Control Block 1200, feedback from Register 1340, results of memory fetches, or any other suitable signal. This unit allows the automatic generation of data flow code by identifying symbols and creating expressions and conditions. Symbols may be identified as any variable within a segment of code that receives a new value. The synthesis of expressions and conditions based on assignments in the program code and segment state will be straightforward to one skilled in the art in light of the description provided here and are not described in further detail. The specific means of generating this logic is not critical to the invention.

Figure 14:
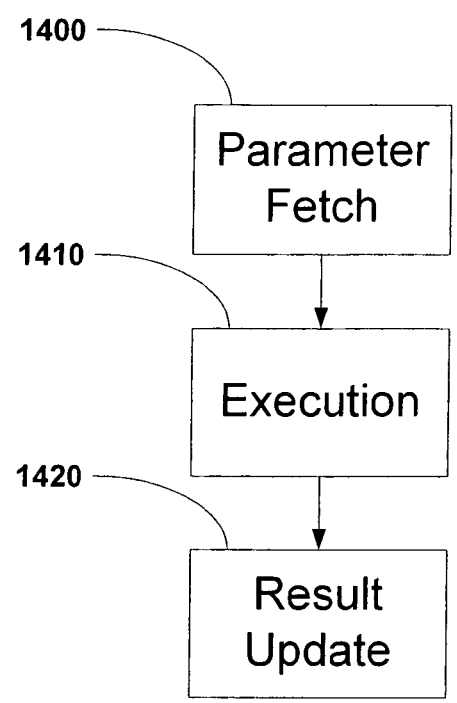
FIG. 14 shows an exemplary embodiment of a basic flow for execution of an automatically-generated accelerator.

The Control Block may include one or a plurality of state machines that may control the flow of execution. FIG. 14 shows an exemplary embodiment of a high-level view of the Control Block state machine. First, a Parameter Fetch state machine 1400 is executed, followed by execution of a function-specific Execution state machine 1410, followed by execution of a Result Update state machine 1420. In some embodiments the order of execution of these state machines may be altered.

The Parameter Fetch state machine 1400 may be used to dequeue parameters and place them in registers or other storage. Its construction for a given technology or architecture may depend only on the number of parameters to be dequeued, and the automatic construction of this state machine will be straightforward for one skilled in the art in light of the description provided here. The Result Update state machine 1420 may be used to enqueue the results from registers. Its construction for a given technology or architecture may depend only on the number of result values to be enqueued, and the automatic construction of this state machine will be straightforward for one skilled in the art in light of the description provided here.

The Execution state machine 1410 will be determined from the flow of the code being offloaded. Any function can be decomposed into a series of Segments, where a Segment is a maximal linear section of code. Segments typically consist of assignments of values to variables, and are separated by flow statements. A segment can be analyzed for automatic creation of logic in the data flow block, and the control flow can be separately analyzed for automatic creation of logic in the control block.

Figure 15:
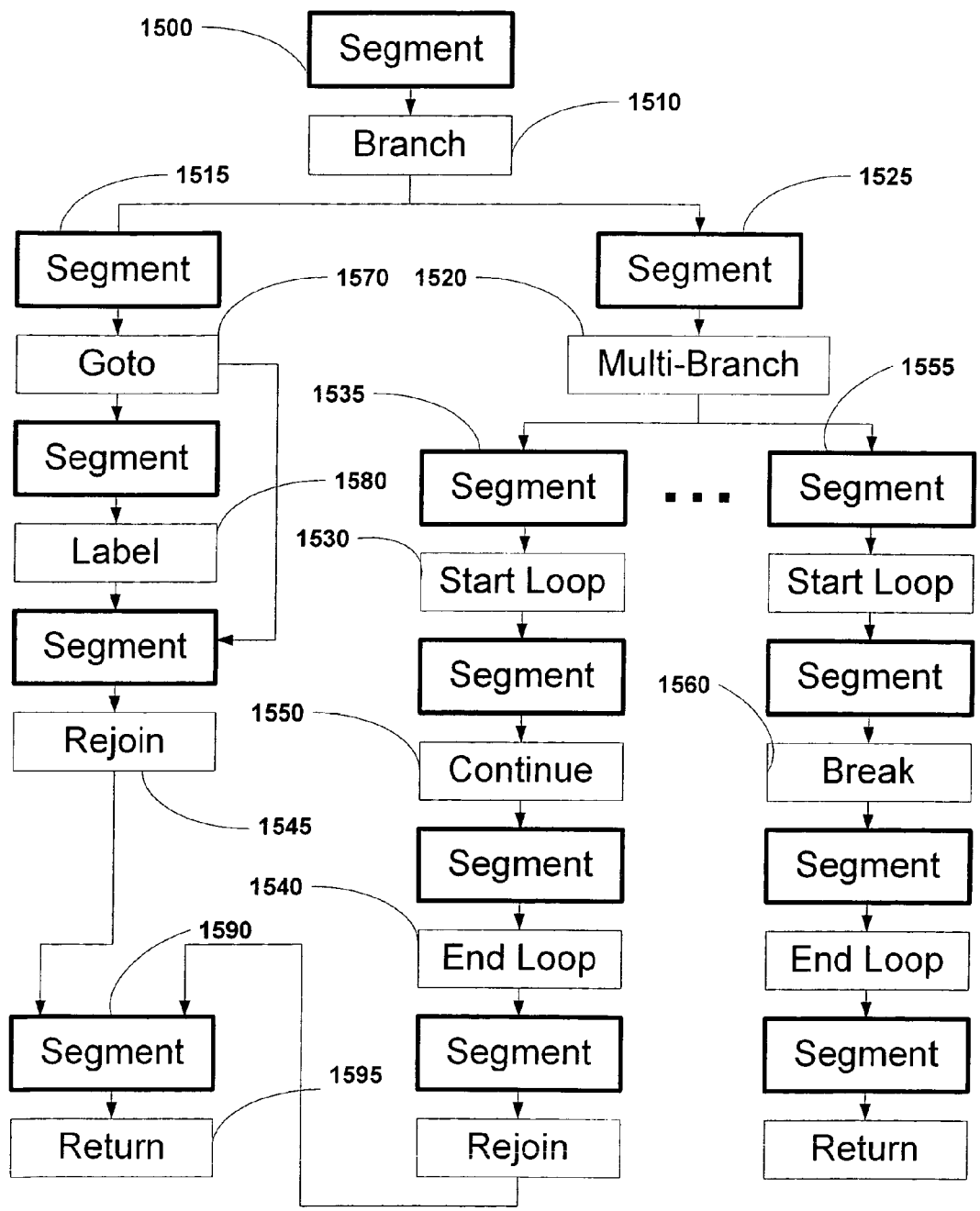
FIG. 15 shows an abstract example of program Segments and Control statements according to an exemplary embodiment of the invention.

Segments and the various flow statements that separate them are illustrated using an example abstraction of a program in the exemplary embodiment of FIG. 15. In this embodiment, there are a number of Segments 1500, arranged in an exemplary configuration with the most common types of flow statements. Branch statement 1510 causes execution to go to or branch to one of two places based on an evaluated condition; this is typically expressed using a statement like an "if/then/else" program construct. In the illustrated embodiment, either Segment 1515 or Segment 1525 is executed next. Following Segment 1515 is a go to (e.g., "Goto") statement 1570, after which is a Segment and then a Label 1580, which might be the target of a Goto statement. Following another statement is a Rejoin statement 1545, which is typically expressed by an "End" or "}" program element at the end of a segment on one side of a branch. After a final Segment, a Return statement 1595 is executed.

Following Segment 1525, a Multi-Branch statement 1520 is found. This may be a branch that can result in more than one possible path, and is typically expressed using a program code statement like "switch" or "case." It may also or alternatively be expressed as a series of "if/then/elseif/ . . . /else" type statements or the equivalent. In this example, multiple flows result, two of which are shown as branches to Segments 1535 and 1555. Following Segment 1535 is a Start Loop statement 1530, which causes the repetitive execution of its contents based on the evaluation of a condition; it's typically expressed by "for", "do", or "do while" statements. After another segment, a Continue statement 1550 occurs; this causes the remaining code inside the loop to be skipped and another loop execution to start. Following another segment, an End Loop statement 1540 occurs; this terminates the loop code and may contain an evaluation. It is typically expressed by "end", "until", "}", and similar or equivalent statements. Following the end of this loop and another segment, another rejoin statement is encountered, which takes the flow back to Segment 1590 to merge flows with the flow discussed previously.

Following Segment 1555 is another loop which operates just like the loop started by Start Loop statement 1530. One difference is that this illustrates a Break statement 1560 instead of Continue statement 1550. A Break statement causes loop execution to cease and sends flow to the segment following the loop. After this segment, a return statement is found.

Note that there can be multiple return points as illustrated in FIG. 15. Note also that a Segment may be degenerate, in that it has no statements in it; the implication of this is that one flow statement may follow another flow statement directly with no intervening assignments. Note also that the flow statements illustrated reflect common flow statements, especially with respect to the ANSI C language, but should not be considered complete and final. Also, while ANSI C is a common language that has been the area of focus in the preferred embodiment, the choice of language is not critical to the invention and it will be readily apparent to workers having ordinary skill in the art that any one or more of a variety of languages may be used.

The following exemplary embodiments as illustrated and described relative to the figures illustrate how a state diagram can be built up from the flow statements shown above. The impact of each flow statement will be shown on its own; given those individual state machine transformations, assembling them together based on an actual program should be straightforward to one skilled in the art in light of the description provided here. The transformations shown and described represent one way of implementing these state machines; other transformations are also possible as well; and the transformations illustrated are exemplary and are not intended to be limiting. There is also no implication as to whether the state machines are created using a Moore or a Mealy or any other model; and details involved in such implementation decisions will be straightforward for workers having ordinary skill in the art in light of the description provided here.

Figure 16:
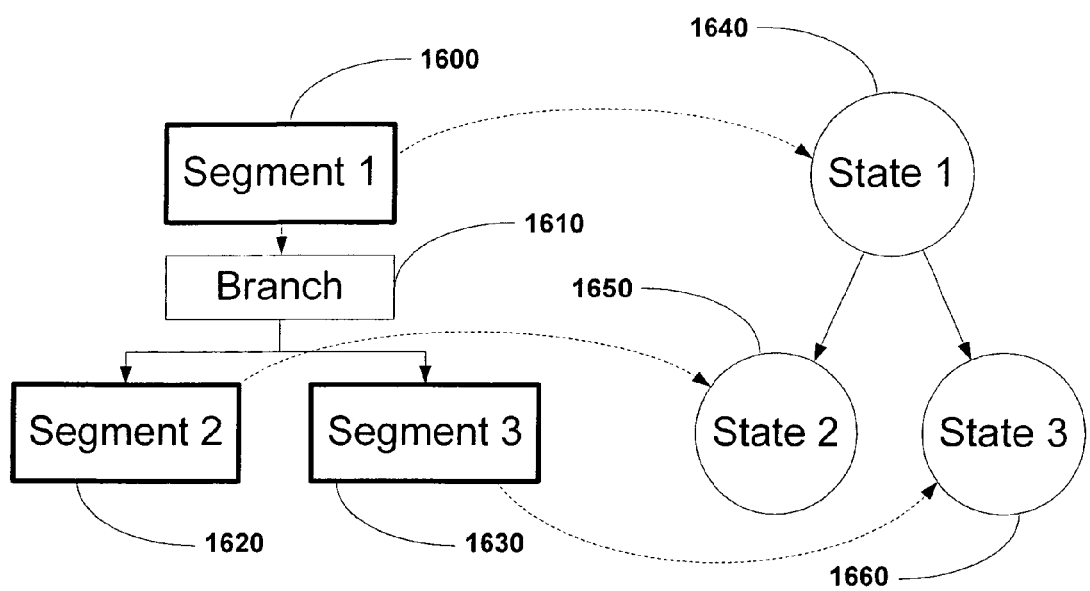
FIG. 16 shows an exemplary embodiment of a state machine transformation for a Branch statement.

FIG. 16 illustrates an exemplary embodiment of a possible state machine transformation from a Branch flow statement. In this example, Segment 1 (1600) branches via Branch statement 1610 into either Segment 2 (1620) or Segment 3 (1630). A state is generated for each segment, so Segment 1 gets State 1 (1640), Segment 2 gets State 2 (1650), and Segment 3 gets State 3 (1660). The branch condition for the state machine may be the same as the branch condition for Branch statement 1610. Note that in a typical program, there may be other flow statements within each side of the branch; the simple Segment on each side here is for simplicity of illustration only, and is not intended to limit the invention or embodiments of the invention in any way. Note that in this and all of the succeeding drawings, correlation between segment name and state name is for ease of illustration only and it will be appreciated that other names or naming conventions may be utilized, and that the naming adopted for this description should not be interpreted to impose any limitations on the invention or on embodiments of the invention.

Figure 17:
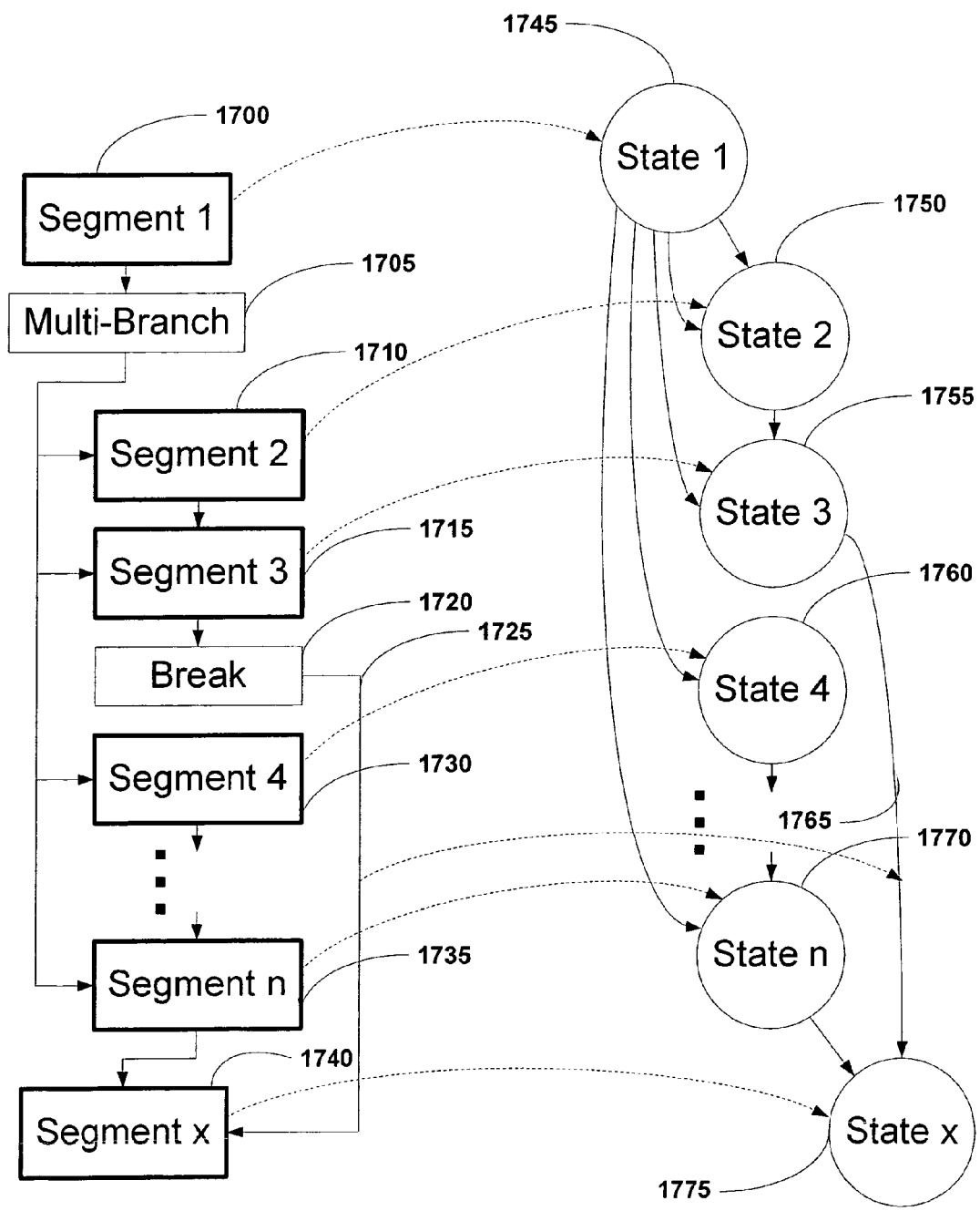
FIG. 17 shows an exemplary embodiment of a state machine transformation for a Multi-Branch statement with fall-through behavior.

FIG. 17 illustrates an exemplary embodiment of a possible transformation for a Multi-branch flow statement, and this specific illustration will follow the semantic of an ANSI switch statement, which has a "fall-through" characteristic in that once a branch point is chosen, all code following that point within the switch construct is executed unless a Break statement is explicitly used to jump out of the switch statement. Multi-branch semantics for other languages may differ and this is provided as an example with the understanding that the specifics of this illustration are not intended to limit the invention to the ANSI C semantics or otherwise.

In this illustration, Segment 1 (1700) is followed by a Multi-Branch statement 1705 that has n−1 branch possibilities. There are branches to Segment 2 (1710), to Segment 3 (1715), to Segment 4 (1730), and the like, up to and including to Segment n (1735), where n is some integer number. Following the Multi-Branch structure is a Segment x (1740). Note that pursuant to the ANSI C semantic, once Segment 2 is entered, flow continues into Segment 3, but after Segment 3, a Break statement (1720) is encountered. This takes flow out of the multi-branch structure down to Segment x via path 1725. Segment 4 through Segment n behave similarly; no assumptions are made about any break statements between them for this illustration; that behavior is not critical to the illustration or the invention. Note that in a typical program, there would or may be other flow statements within the various branch targets themselves; the simple Segments shown at each branch target are for simplicity in illustration only, and are not intended to limit the invention.

Each segment is assigned or gets a state, so Segment 1 gets State 1 (1745), Segment 2 gets State 2 (1750), Segment 3 gets State 3 (1755), Segment 4 gets State 4 (1760). Segment n gets State n (1770), and Segment x gets State x (1775). Each of the possible branch paths results in an equivalent state transition, and the fall-through paths are also created. Break path 1725 may result in an extra transition 1765. The transition conditions in the state machine are derived from the branching conditions. Because of the fall-through characteristics and the fact that conditions are typically evaluated sequentially in a program, the parallel transitions in the state machine should have their conditions further qualified to eliminate possible ambiguity that might result from possible lack of branch mutual exclusivity. Such qualification is such that if, for example, the first branch condition is Condition 1, and the second branch condition is Condition 2 in the program, then the state machine transitions would be Condition 1 and (Condition 2 and not Condition 1) for the respective state machine transitions. Such qualification of transitions will be straightforward to one skilled in the art in light of the description provided here.

Figure 18:
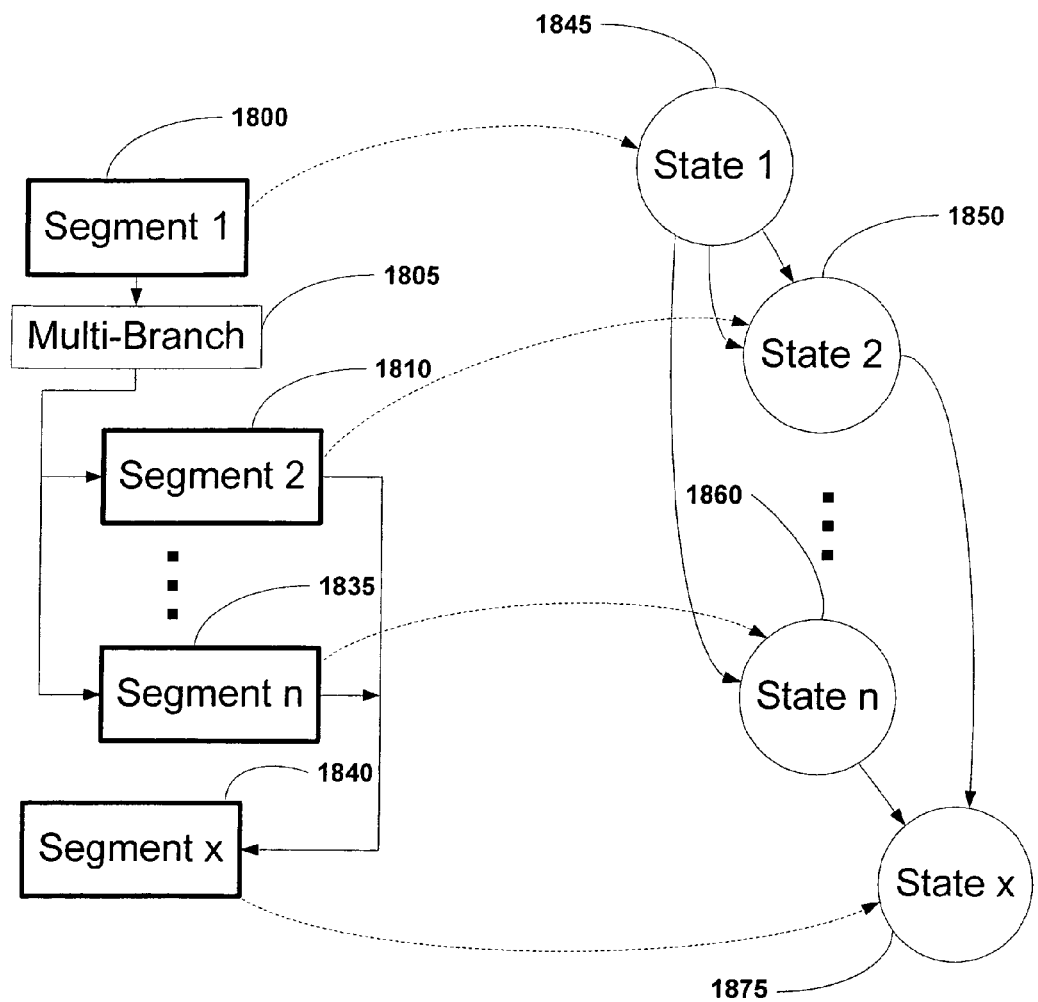
FIG. 18 shows an exemplary embodiment of the state machine transformation for a Multi-Branch statement without fall-through behavior.

FIG. 18 is an embodiment illustrating a variation on the Multi-Branch concept, such as would be implemented using a series of "if/then/elseif/ . . . /else" or equivalent statements. It is similar to the case of a switch statement, except that there is no fall-through behavior. Thus after Segment 1 (1800), there is the Multi-Branch statement or statements that collectively define the branching if analyzed statically (1805). Shown are possible targets Segment 2 (1810) through Segment n (1835). After the Multi-Branch structure, flow continues in Segment x (1840). As before, each segment is assigned or gets a state, so Segment 1 gets State 1 (1845), Segment 2 gets State 2 (1850), Segment n gets State n (1860), and Segment x gets State x (1875). Each branch segment has a path to Segment x when done, and a corresponding transition exists to State x in the state machine due to the lack of fall-through.

As with the prior Multi-Branch, due to the fact that conditions are typically evaluated sequentially in a program, the parallel transitions in the state machine should have their conditions further qualified to eliminate possible ambiguity due to possible lack of branch mutual exclusivity. Such qualification is such that if, for example, the first branch condition is Condition 1, and the second branch condition is Condition 2 in the program, then the state machine transitions would be Condition 1 and (Condition 2 and not Condition 1) for the respective state machine transitions. Such qualification of transitions will be straightforward to one skilled in the art in light of the description provided here.

Note also that in a typical program, there would or may be other flow statements within the various branch targets themselves; the simple Segments shown at each branch target are for simplicity in illustration only, and are not intended to limit the invention.

Figure 19:
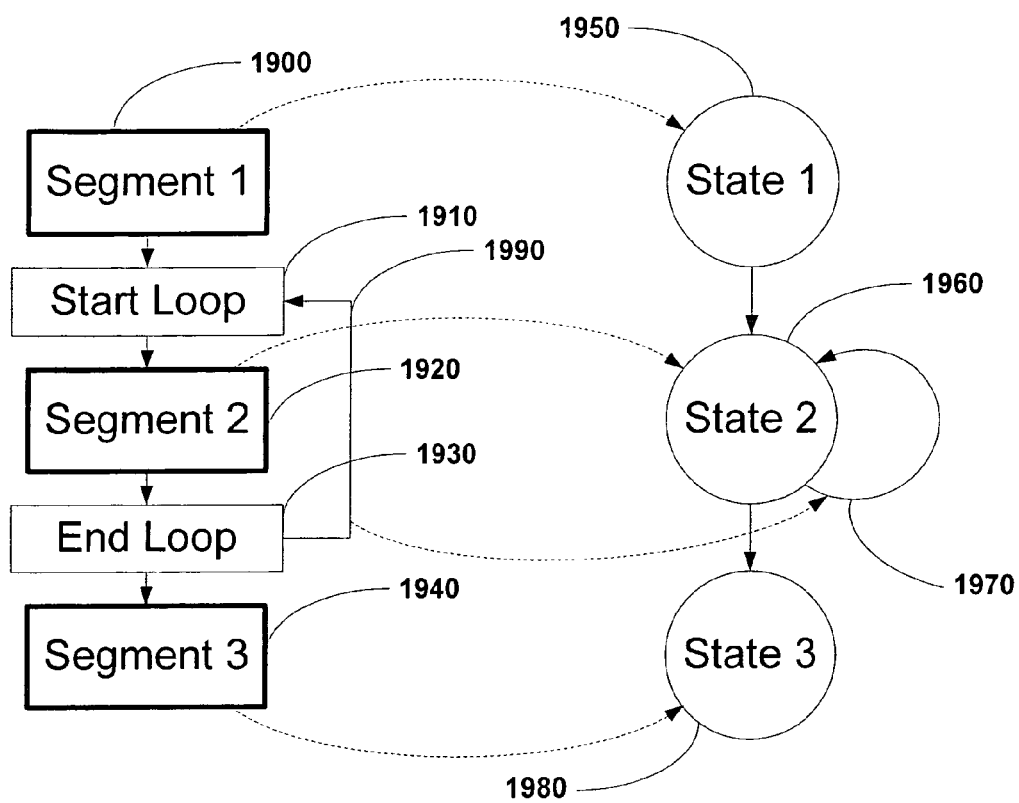
FIG. 19 shows an exemplary embodiment of the state machine transformation for a Loop with evaluation at the end of the loop.

FIG. 19 shows an exemplary embodiment of a transformation for a simple loop. This particular exemplary loop is evaluated at the end for completion, meaning that the loop body is guaranteed to be executed at least once. The loop is entered from Segment 1 (1900) via Start Loop statement 1910. Within the loop is Segment 2 (1920), which is followed by an End Loop statement 1930. Path 1990 closes the loop; and, the loop itself is followed by Segment 3 (1940). As before, Segment 1 (1900) gets State 1 (1950); Segment 2 (1920) get State 2 (1960), and Segment 3 (1940) gets State 3 (1980); loop-back transition 1990 yields state transition 1970. Note that in a typical program, there may typically be other flow statements within the loop itself; and it will be understood that the simple Segment within the loop shown and describe here is for simplicity in illustration only, and is not intended to limit the invention or any embodiment of the invention. The transitions in the state machine may be determined by the loop evaluation conditions in the original program, and it will be apparent that they may be derived in a manner straightforward to one skilled in the art in light of the description provided here.

Figure 20:
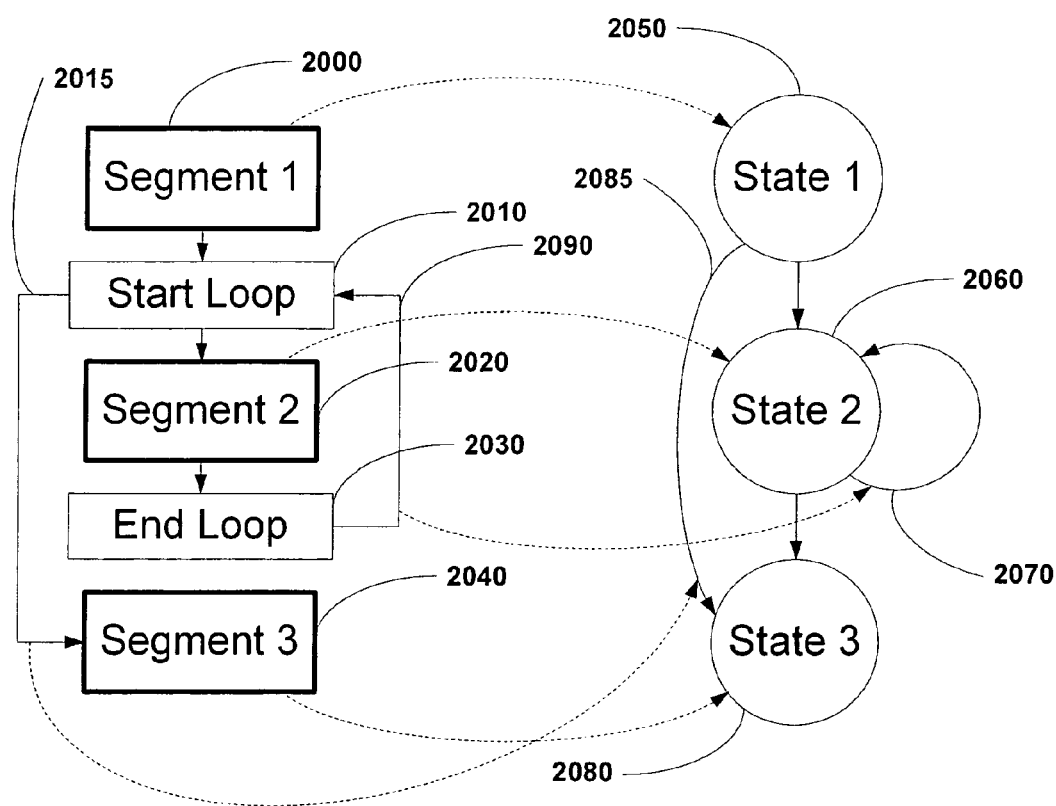
FIG. 20 shows an exemplary embodiment of the state machine transformation for a Loop with evaluation at the beginning of the loop.

FIG. 20 is an illustration showing an exemplary transformation for another simple loop. This particular exemplary loop is evaluated at the start for completion, meaning that the loop body may not be executed at all. The loop is entered from Segment 1 (2000) via Start Loop statement 2010. Within the loop is Segment 2 (2020), which is followed by an End Loop statement 2030. Path 2090 closes the loop; and the loop itself is followed by Segment 3 (2040). If the loop condition is met at the start of the loop, then the loop body will be bypassed using path 2015. Note that in a typical program, there may usually be other flow statements within the loop itself; the simple Segment within the loop here is for simplicity in illustration only, and is not intended to limit the invention or any embodiment of the invention.

As with the other examples, each segment is assigned, achieves, or gets a state; in this case Segment 1 gets State 1 (2050), Segment 2 gets State 2 (2060), and Segment 3 gets State 3 (2080). Loop return path 2050 gets corresponding transition 2070, and bypass path 2015 gets corresponding path 2085. The transitions in the state machine may be determined by the loop evaluation conditions in the original program, and can be derived in a manner straightforward to one skilled in the art in light of the description provided here.

Note that the previous two loop examples notwithstanding, all loops can be generalized into one form having both start and end conditions, either or both of which may be degenerate. The analysis provided here would apply equally to such a loop, and this general case is not intended to be excluded from the scope of the invention.

Figure 21:
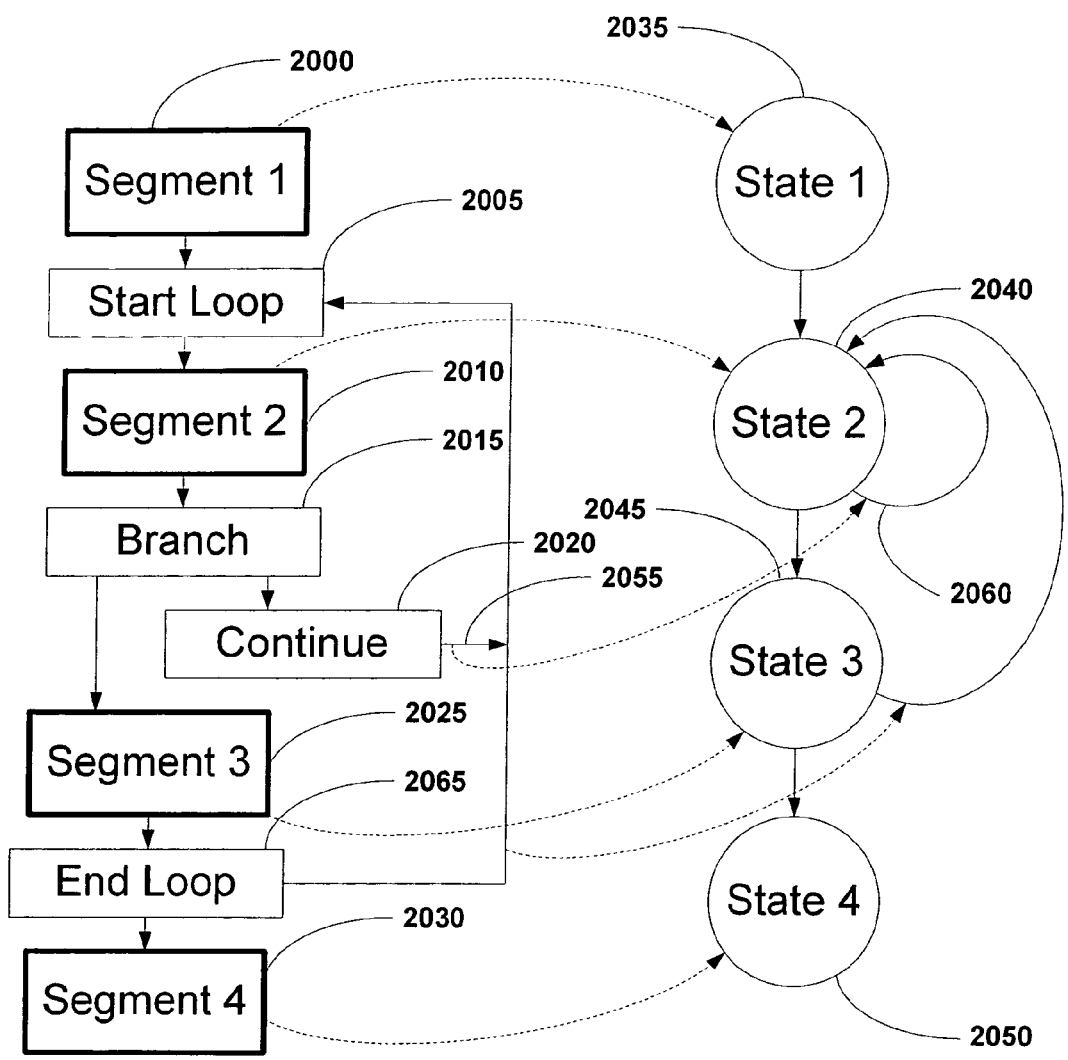
FIG. 21 shows an exemplary embodiment of the state machine transformation for a Loop with a Continue statement in the body.

FIG. 21 illustrates an exemplary variation on a loop, in which a Continue statement affects the flow. Such a Continue statement would typically follow a branch internally to allow one branch to restart the loop and the other branch to continue within the loop.

Here Segment 1 (2000) is followed by Start Loop statement 2005, and Segment 2 (2010) is the first segment within the loop body. A Branch statement 2015 occurs, and one branch is to Continue statement 2020, while the other branch is to Segment 3 (2025). The flow from the Continue statement is, by definition, back to the start of the loop via path 2055. In this example, execution of Segment 3 continues to End Loop statement 2065, after which flow either returns to the top of the loop or continues to Segment 4, depending on whether the loop conditions have been met.

The state machine is derived as before where Segment 1 gets State 1 (2035), Segment 2 gets State 2 (2040), Segment 3 gets State 3 (2045), and Segment 4 gets State 4 (2050). The early loop return path 2055 caused by the Continue statement gets a corresponding state transition 2060. Here, the transition conditions are determined by the branch conditions in the original program in a manner straightforward to one skilled in the art.

Figure 22:
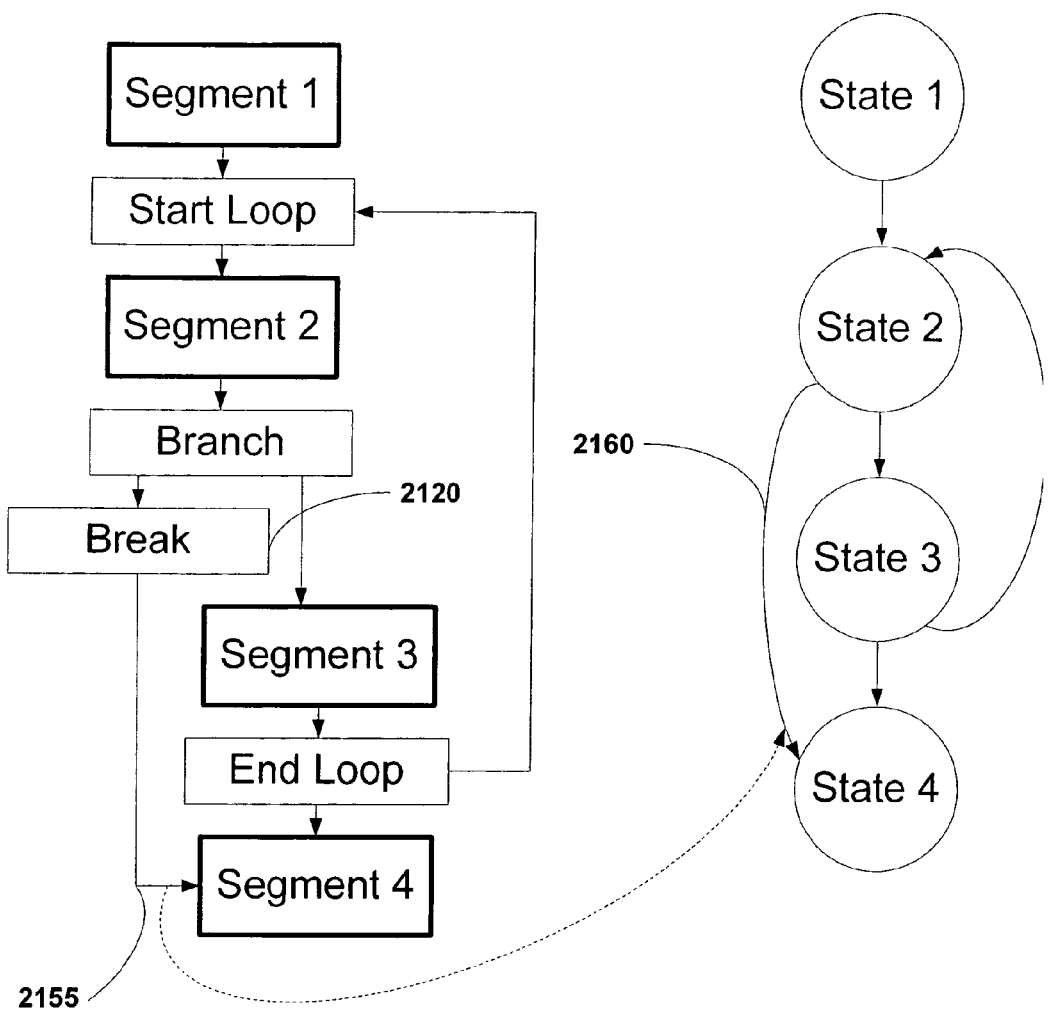
FIG. 22 shows an exemplary embodiment of the state machine transformation for a Loop with a Break statement in the body.

FIG. 22 is an illustration showing one more alternative or variation on the loop very much like that of FIG. 21, except that the Continue statement 2020 has been replaced by Break statement 2120. Instead of causing an early loop return, this causes an exit from the loop via path 2155. This is effected in the state machine by corresponding transition 2160. Other notes, qualifications, and broadening from the discussion of FIG. 21 apply here as well.

While the examples of FIG. 21 and FIG. 22 have used loops with loop conditions at the end of the loop, similar analysis can be done for loops with loop conditions at the start and/or with loop conditions at both the start and end of the loop.

Figure 23:
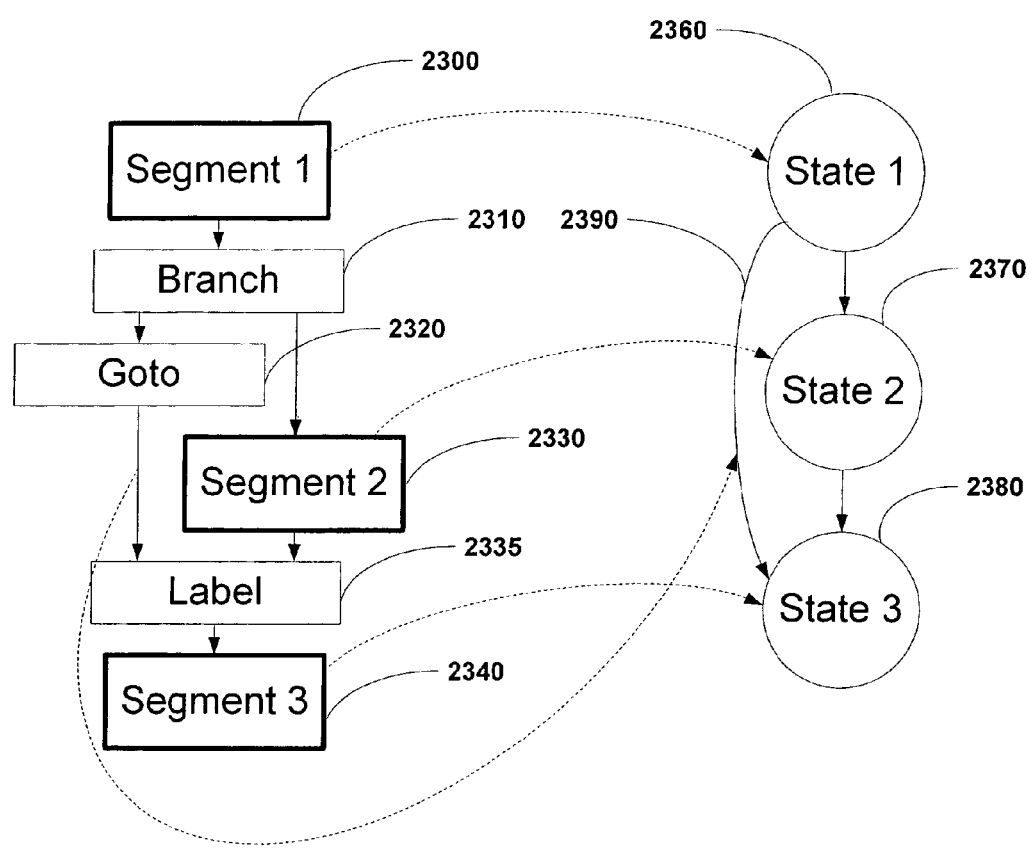
FIG. 23 shows an exemplary embodiment of the state machine transformation for a Goto statement.

FIG. 23 illustrates an exemplary embodiment of a state machine transformation for a go to (e.g., "Goto") type program statement. Such a statement is typically paired with another Label statement that specifies the destination of the execution jump. While Goto statements are often deprecated in programming, they are legal in many languages and they exist, and should be accounted for in any transformation system. As illustrated, one would typically be paired with a branch statement or other flow decision.

In the example of FIG. 23. Segment 1 (2300) is followed by a Branch statement 2310. One branch of the Branch statement goes to Segment 2 (2330); and the other goes to Goto statement 2320. A label 2335 follows Segment 2, and flow from Goto statement 2320 goes directly to Label statement 2335 on path 2350. Segment 3 (2340) follows Label statement 2335. As before, each segment is assigned, acquires, or otherwise gets a state, so Segment 1 gets State 1 (2360), Segment 2 gets State 2 (2370), and Segment 3 gets State 3 (2380). Path 2350 is transformed as transition 2390. The transition condition derives from the branch condition for Branch statement 2310 in a manner straightforward to one skilled in the art.

Figure 24:
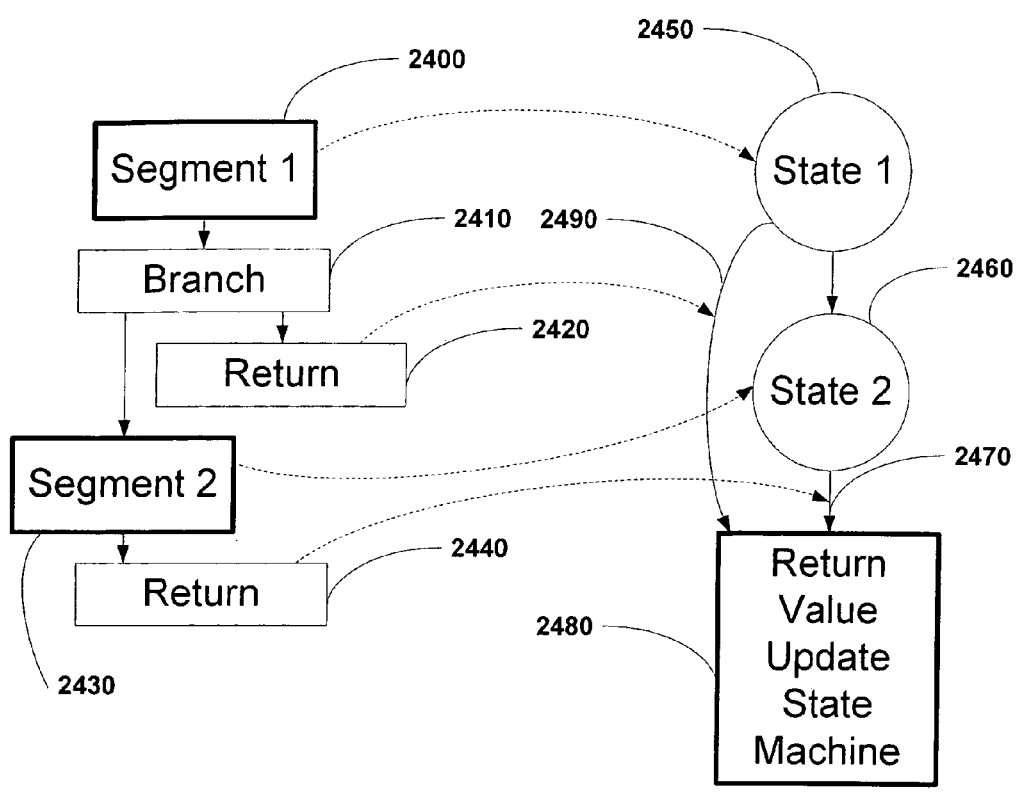
FIG. 24 shows an exemplary embodiment of the state machine transformation for a Return statement.

FIG. 24 illustrates an exemplary embodiment of a transformation for multiple Return statements. When there are multiple Return statements, all but one are generally associated with a flow branching decision, illustrated in this case with a Branch statement. Return statements indicate the end of execution, and therefore move the offload execution out of the main logic portion and into the result value update portion. The state machine illustration therefore includes a Return Value Update State Machine 2480.

Segment 1 (2400) is followed by Branch statement 2410. One branch continues on to Segment 2 (2430), and the other to an immediate Return (2420). Segment 2 encounters a Return statement 2440, which ends execution. As before, Segment 1 maps to State 1 (2450), and Segment 2 maps to State 2 (2460). Each of the Return statements creates a transition directly to Return Value Update State Machine 2480; Return statement 2420 creates transition 2490, and Return statement 2440 creates transition 2470. The conditional logic for transition 2490 is derived from the branch condition for Branch statement 2410 in a manner straightforward to one skilled in the art. The transition 2470 is unconditional since there was no Branch statement leading to Return statement 2440.

The above descriptions provide examples of state machine construction based on program topology. Other methods and mappings may also serve the needs of the invention, and the specific mappings shown are intended to be exemplary and not limiting.

The states created for the various segments may themselves contain state machines for the purpose of executing memory or other resource access (such as for example, external memory access) if such access is required for such things as global variable usage, pointer dereferencing, or other operations or accesses. One purpose of these state machines is to create the memory interface signals and timing required or desired for such access, and therefore the specific construction of each state machine will or may depend on the specific memory or other resource being accessed, and will be apparent to those having ordinary skill in the art to implement these in light of the description provided here. In the event that the invention or embodiments of the invention are implemented on a silicon or other semiconductor chip, the memories may be co-resident on the same chip as the offload or accelerator, or external to that chip. A plurality of chips may alternatively be employed. The type and location of memory and the specific construction of the memory access state machine is not critical to the invention.

The states created for the various segments may further contain other states for the purposes of maintaining sequential dependencies. Expression and condition logic is parallelized as much as possible, but cannot be blindly parallelized.

The following discussion will use the following lines of code as an example.

(1) x=2;
(2) y=5;
(3) z=x+y;
(4) y=2;

This set of code cannot be completely parallelized because there is first ambiguity between two assignments to y (one to 5 in line (2) of the code, and the other to 2 in line (4) of the code), and because the resulting value of z on line (3) is uncertain because it depends on how that ambiguity for the y variable is resolved. In fact the sequential nature of the original program dictates what the correct values are, and the dependencies in this code are such that lines (1) and (2) can be parallelized; line (3) relies on lines (1) and (2), and line (4) can be executed in parallel with line (3) as long as it is assured that the value used for y in line (3) will be the value prior to the assignment in line (4).

This can be managed by modeling line numbers and including dependencies in the hardware model. In the model of the hardware creating the y variable, there are two assignments, one if line (2), and another if line (4). Assignment of the correct value of z can be assured by qualifying the assignment with the requirement that line (2) be complete but not line (4). While the model can start by representing every statement in the program as a qualifier, in actuality only some statements will be dependent on other statements, and many of those qualifiers can be pruned away using techniques that will be straightforward to one skilled in the art.

The result will be states added to the state machine models shown above for those segments where dependencies exist. For example, if the above four lines of code constituted a segment, then a model equivalent to that illustrated in FIG. 25 may be created.

Figure 25:
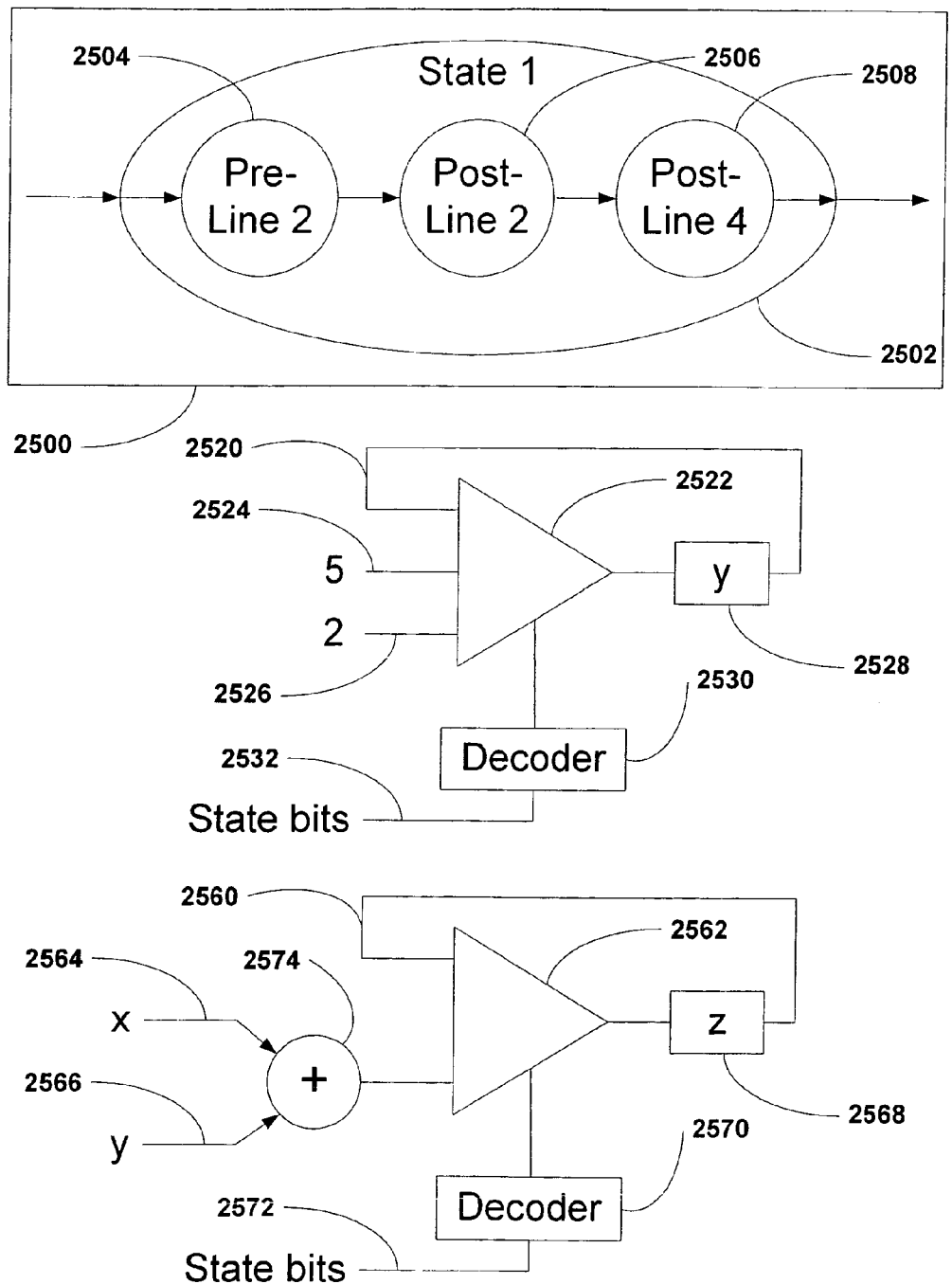
FIG. 25 shows an exemplary embodiment of state machine modifications required to reflect sequential dependencies.

In FIG. 25, there is a state machine 2500 containing a segment state State 1 (2502), possibly generated using the methods described above or similar methods. Within State 1 (2502), three sub-states are created: Pre-Line 2 to represent the state before line 2 is executed (2504); Post-Line 2 to represent the state after line 2 is executed (2506), and Post-Line 4 to represent the state after line 4 is executed (2508). The encoding of these states may be accomplished using any of the standard state encoding schemes known to those skilled in the art, including binary and Grey schemes. Other schemes may readily be appreciated by workers having ordinary skill in the art in light of the description provided here. The specific encoding scheme used is not critical to the invention. The result of the encoding will be state bits that can be used as qualifiers or conditions when decoded.

Furthermore, as illustrated in the example of FIG. 25, register 2528 containing variable y is fed by a multiplexer 2522 that is controlled by the value determined by Decoder 2530. Decoder 2530 is fed by the state bits on signal 2532. Signal 2532 will include enough lines to represent the state using the chosen state encoding scheme, but beyond this the number of lines is not critical to the invention. The decoder is designed such that if the value of the state bits represents Pre-Line 2, then signal 2526 having the value "2" will be passed to register 2528; if the value of the state bits represents Post-Line 2, then signal 2524 having the value "5" will be passed to register 2528; if the value of the state bits represents any other state, then the value of register 2528 will be held by ensuring that it always receives its current value via feedback line 2520. The design of Decoder 2530 will be straightforward for one skilled in the art in light of the description provided here.

Likewise, register 2568 containing variable z is fed by a multiplexer 2562 that may be controlled by the value determined by Decoder 2570. Decoder 2570 may be fed by the state bits on signal 2572. Signal 2572 will consist of enough lines to represent the state using the chosen state encoding scheme, but beyond this the number of lines is not critical to the invention. The decoder may be designed such that if the value of the state bits represents Post-Line 2, then the sum of signal 2564, carrying the value of x, and signal 2566, carrying the value of y (from Register 2528, which explicit connection is omitted from the drawing for simplicity but is considered implicit based on the equivalence of "y" in Register 2528 and "y" on signal 2566), as added in adder 2574, will be passed to register 2568; if the value of the state bits represents any other state, then the value of register 2568 will be held by ensuring that it always receives its current value via feedback line 2560. The design of Decoder 2570 will be straightforward for one skilled in the art in light of the description provided here.

The example of FIG. 25 represents but one exemplary way of enforcing sequential dependencies in otherwise parallel code. Other approaches exist and will be apparent to workers having ordinary skill in the art in light of the description provided here, and the specific approach used is not critical to the invention.

Figure 26:
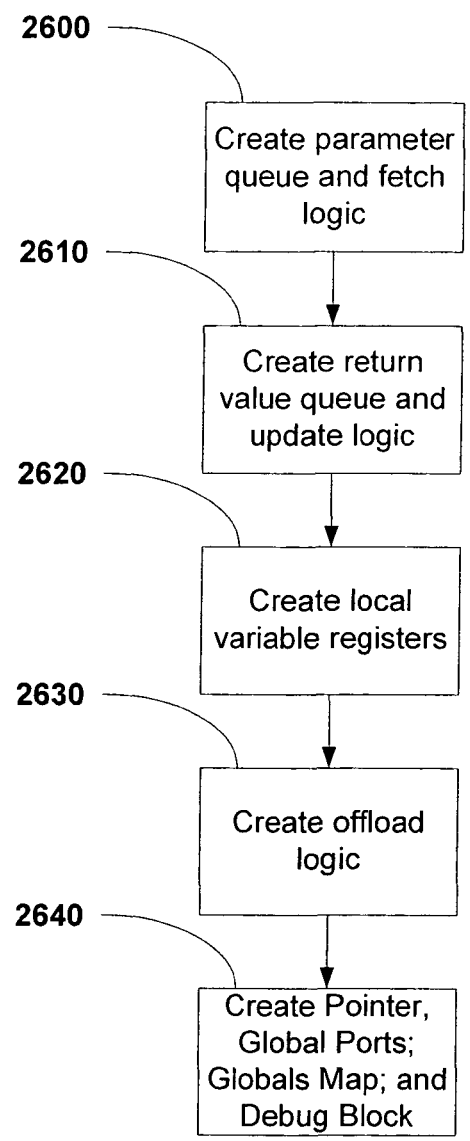
FIG. 26 shows an exemplary embodiment of a method for creating a hardware offload from software.

One possible embodiment of a process of offload creation is outlined in the embodiment illustrated and described relative to FIG. 26. In this flow-chart diagram, first parameter structures, including queue, registers and fetch state machine, are created (Step 2600), then return value structures, including queue, registers and update state machine, are created (Step 2610), then local variable registers are created (Step 2620). Then the internal offload logic is created (Step 2630). Following logic creation, any items such as pointer ports, global ports, the globals map, and a debug block can be created and connected in a manner straightforward to one skilled in the art in light of the description provided here. There is no requirement that the steps proceed in the order shown. Update logic can be created before or simultaneously with fetch logic, for example.

Figure 27:
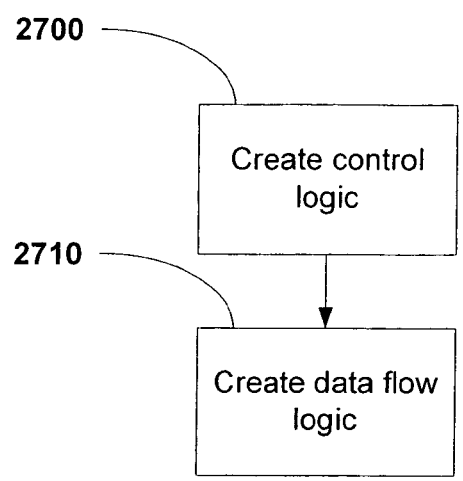
FIG. 27 shows an exemplary embodiment of a method of creating internal offload logic.

FIG. 27 provides an exemplary illustration of how the internal offload logic can be created, as per Step 2630 above. The control logic is created (Step 2700), and then the data flow logic is created (Step 2710). There is no requirement that these steps occur in this order; they may be reversed. The subsequent discussion may be adjusted in a manner straightforward to one skilled in the art in light of the description provided here.

Figure 28:
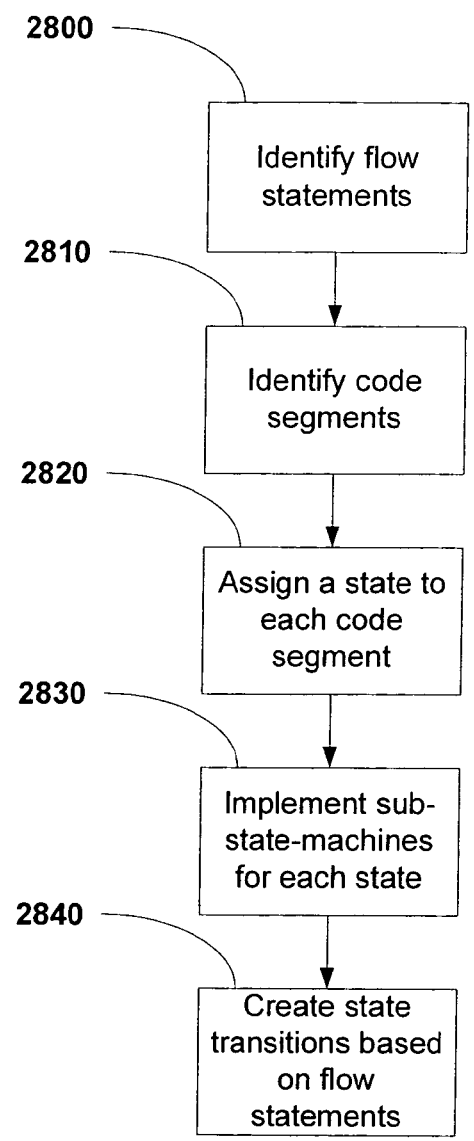
FIG. 28 shows an exemplary embodiment of a method of creating control logic.

FIG. 28 provides an exemplary illustration of how the control logic can be created, as per step 2700 above. First flow statements are identified (Step 2800), and then code segments are identified (Step 2810). A state is then assigned to each code segment (Step 2820). Following this, sub-state-machines are implemented in each state (Step 2830), and then state transitions are created based on the flow statements (Step 2840). There is no requirement that these steps occur in this order; they may be executed in a different order. The subsequent discussion may be adjusted in a manner straightforward to one skilled in the art in light of the description provided here.

Figure 29:
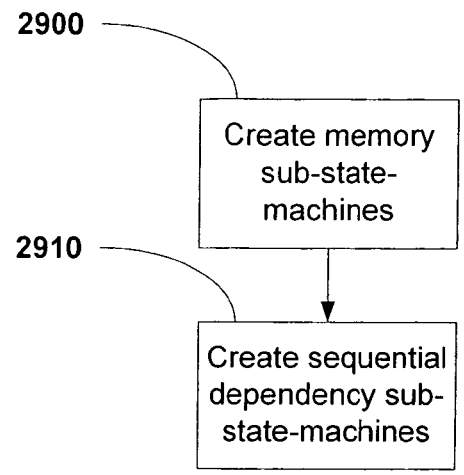
FIG. 29 shows an exemplary embodiment of a method of creating sub-state-machines.

FIG. 29 provides an exemplary illustration of how the sub-state-machines can be created, as per Step 2830. First the memory sub-state-machines are created (Step 2900), and then the sequential dependency sub-state-machines are created (Step 2910). There is no requirement that these steps occur in this order; they may be reversed. The subsequent discussion may be adjusted in a manner straightforward to one skilled in the art in light of the description provided here.

Figure 30:
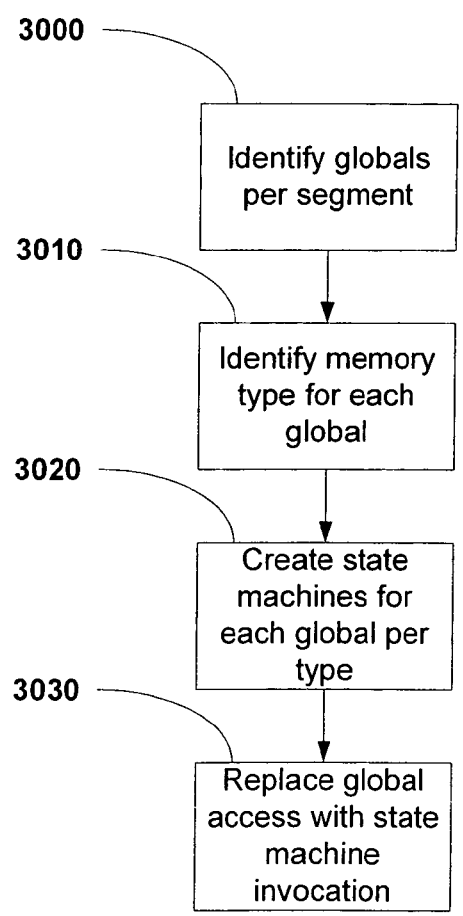
FIG. 30 shows an exemplary embodiment of a method of creating memory access sub-state-machines.

FIG. 30 provides an exemplary illustration of how the memory sub-state-machines can be created, as per Step 2900 above. First the global variables are identified for each segment (Step 3000). Then the memory type for each global is determined (Step 3010). The memory type may be identified by any suitable means by the user; in the current embodiment. the memory type information is provided through a mapping process that provides a model of each memory and its type. Another possibility would be for a computer program executing these steps to inquire specifically of the user by means of a dialog or other such user interface as to the memory types. Once the memory types are known, a state machine for each global variable access can be created (Step 3020) according to its memory type and access type (read or write), in a manner straightforward to one skilled in the art in light of the description provided here. Once the state machines have been created, the original statements accessing the global variables can be replaced by invocation of the respective state machines (Step 3040). While this discussion has focused on memory access, it in fact applies to any resource access requiring controlled timing for correct access (such as a UART, for example). and the invention is not limited in scope to global memory access.

Figure 31:
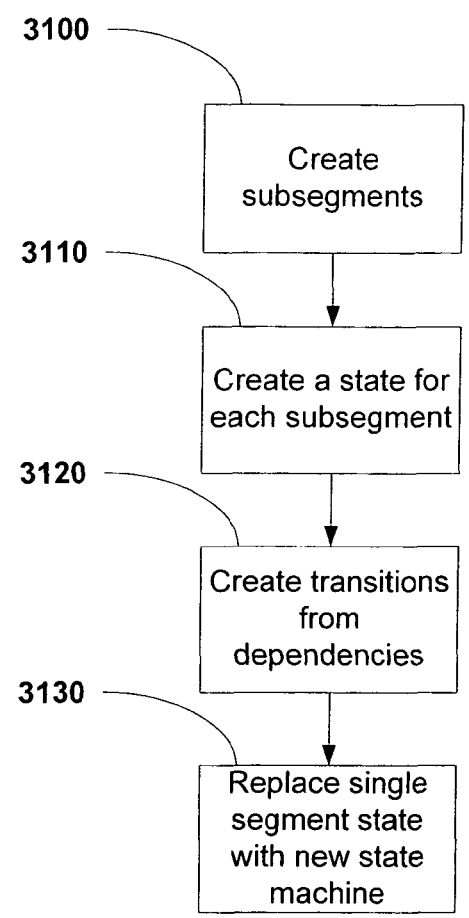
FIG. 31 shows an exemplary embodiment of a method of creating sequential dependency sub-state-machines.

FIG. 31 provides an exemplary illustration of how the sequential dependency sub-state-machines can be created, as per Step 2910 above. First subsegments are created (Step 3100) by breaking the segment at each statement having a dependency requiring it to run after prior statements. A state is then created for each such subsegment (Step 3110). Transitions from state to state are created (Step 3120) based on the specific dependency in a manner straightforward to one skilled in the art in light of the description provided here. Finally, the original single state that was created for the given segment in step 2820 is replaced by the newly generated sub-state-machine (Step 3140).

Figure 32:
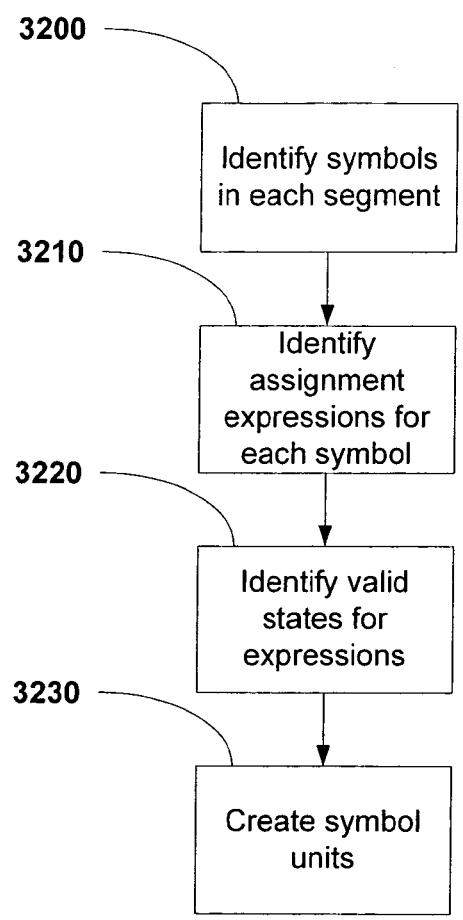
FIG. 32 shows an exemplary embodiment of a method of creating data flow logic.

FIG. 32 provides an exemplary illustration of how the data flow logic can be created, as per Step 2710 above. First all symbols in each code segment are identified (Step 3200). Then all of the assignment expressions for each symbol are identified (Step 3210). Each of those assignment expressions is then associated with a state within which that assignment is valid (Step 3220). From this information, symbol units are created (Step 3230).

Figure 33:
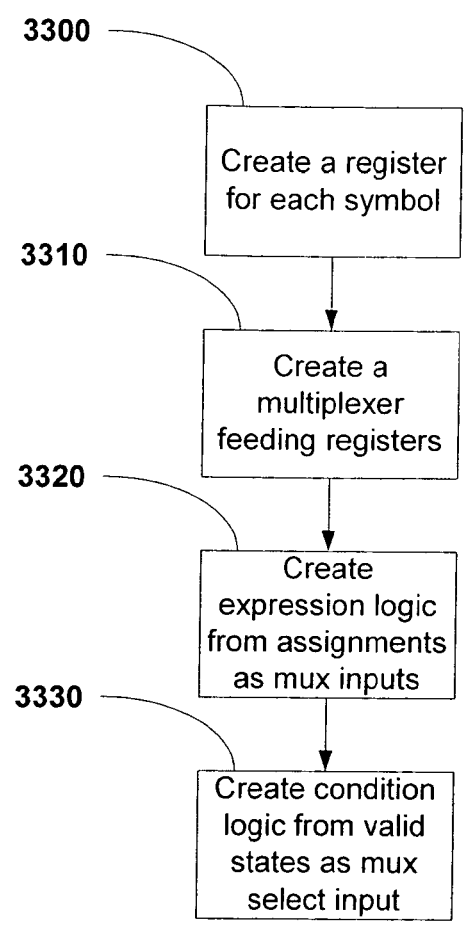
FIG. 33 shows an exemplary embodiment of a method of creating symbol units.

FIG. 33 provides an exemplary illustration of how the symbol units can be created, as per Step 3230 above. First a register is created for each symbol (Step 3300). Then a multiplexer is created as an input to each register (Step 3310). Each assignment expression identified in Step 3210 is then converted to expression logic (Step 3320). The output of each of these expression logic blocks are connected as inputs to the multiplexer. The valid states for each assignment identified in Step 3220 are used to create multiplexer selection logic (Step 3330) to ensure that the multiplexer selects the appropriate input when the appropriate state is reached. The creation of expression and condition logic can be accomplished in a manner straightforward to one skilled in the art in light of the description provided here These specific steps are exemplary only, and may be performed in a different order, including but not limited to in ways as described above. Any changes to the process implied by such variations will be straightforward to manage by one skilled in the art in light of the description provided here.

The resulting expression of the hardware model created by conversion of software code can be realized in any hardware language such as VHDL or Verilog. The specific text created will depend on the language, but the text and language chosen are not critical to the invention.

Figure 34:
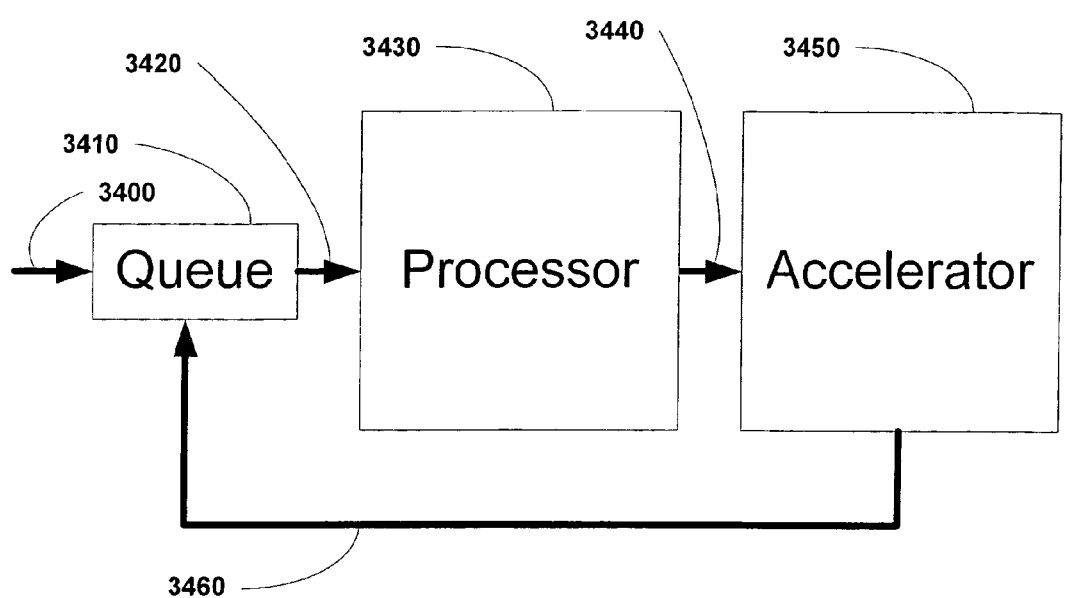
FIG. 34 illustrates an exemplary embodiment of an architecture that allows asynchronous offloading.

The configuration of the generated offload with respect to the processor can be a simple direct connection, with parameters and results coming from and going to, respectively, the processor directly. In addition, however, the exemplary embodiment of the system illustrated in FIG. 34 is also created. This configuration shows Processor 3430 invoking Accelerator 3450 via connection 3440. Processor 3430 receives its tasks from Queue 3410 on connection 3420; some tasks come in via input 3400, but the results of Accelerator 3450 can also be placed on Queue 3410 via connection 3460. This allows Accelerator 3450 to act as an asynchronous offload, with its results staying with Processor 3430, even if Processor 3430 is single-threaded and has no operating system support for multi-threading.

This embodiment has been realized in an FPGA using MicroBlaze™ processors to invoke the accelerator, but is not limited to FPGAs. and could be implemented in any suitable fashion including ASIC or SoC or in other ways. In addition, the applicability is not limited to utilization with MicroBlaze™ processors, but could also be used with Nios™, Mico32™, or any other suitable processor or logic.

Figure 35:
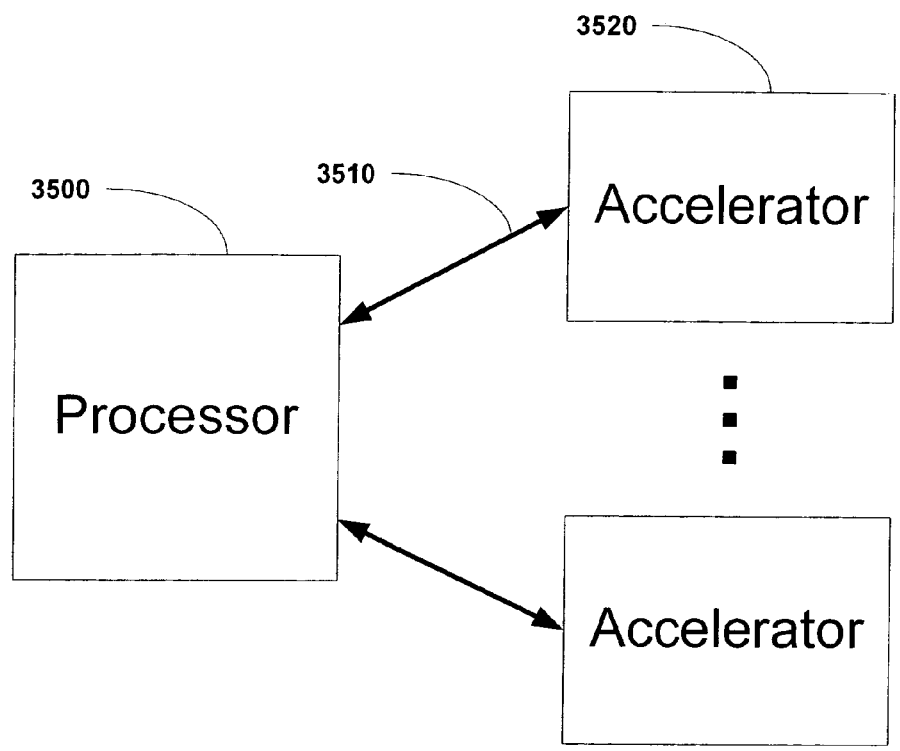
FIG. 35 illustrates an exemplary embodiment of point-to-point processor-to-accelerator connections.

Connection 3440 between Processor 3430 and Accelerator 3450 may be a traditional bus, but significantly, can also be a point-to-point direct connection as illustrated in the embodiment of FIG. 35, or a connection of some other type. This connection can be accommodated on processors allowing external point-to-point connections. As a non-limiting example, in some FPGAs a Fast Simplex Link (FSL) connections may be used with the MicroBlaze™ processor. Here Processor 3500 is connected to a series of Accelerators 3520, each with an individual point-to-point connection 3510. Using this non-traditional configuration eliminates the delay and possible stalling due to bus arbitration between the various accelerators.

This embodiment has been realized in an FPGA using MicroBlaze processors and FSLs to invoke the accelerator, but is not limited to FPGAs, and could be implemented in any suitable fashion including ASIC or SoC or by other means. In addition, the applicability is not limited to utilization with MicroBlaze processors, but could also be used with Nios, Mico32, or any other suitable processor.

Figure 36:
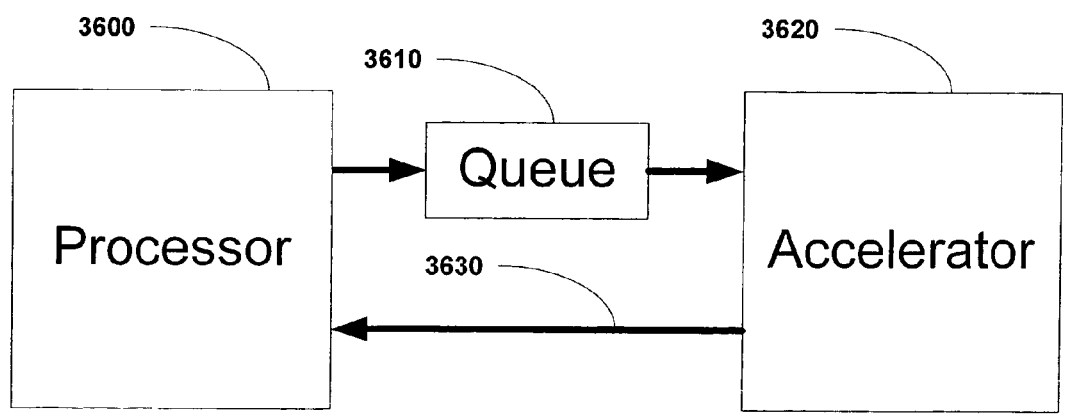
FIG. 36 illustrates an exemplary embodiment of architecture that allows accelerator task queuing.

These connections may further have queues attached to minimize processor or offloading stalls while one or the other is busy. FIG. 36 illustrates an exemplary embodiment of a system where Processor 3600 sends its requests to Accelerator 3620 via Queue 3610. The specifics of the connection and the queue can vary, and will be straightforward to one having ordinary skill in the art to implement such queue in light of the description provided here. The return path 3630 indicates synchronous usage of the Accelerator 3620; the queued input to the accelerator is also possible in an asynchronous configuration, where return path 3630 would go instead to the input queue of Processor 3600 (See for example, Queue 3410 in the embodiment illustrated in FIG. 34).

This embodiment has been realized in an FPGA using MicroBlaze™ processors and FSLs to invoke the accelerator, but again is not limited to FPGAs, and could be implemented in any suitable fashion including ASIC or SoC or by other means. In addition, the applicability is not limited to utilization with MicroBlaze™ processors, but could also be used with Nios™, Mico32™, or any other suitable processor.

Figure 37:
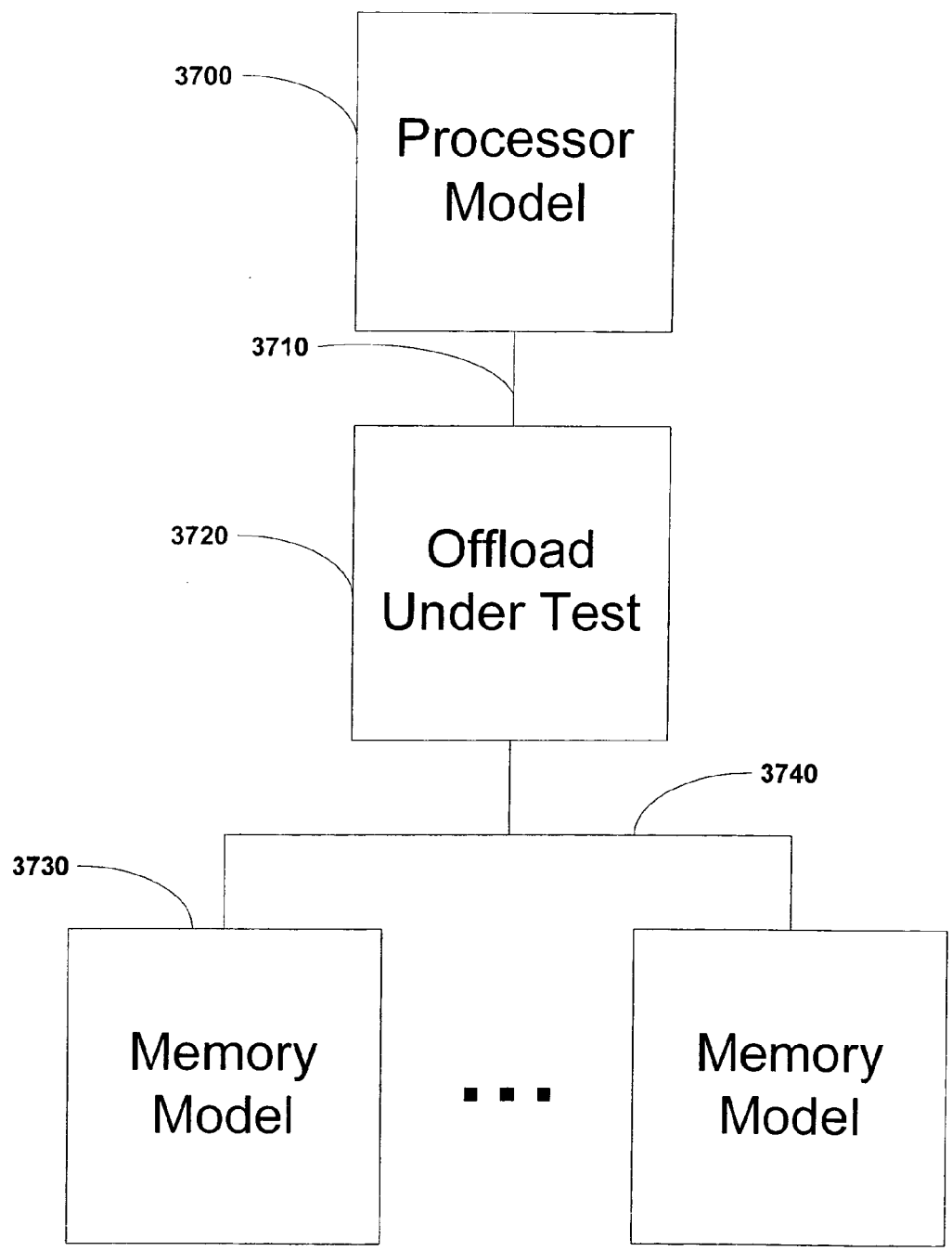
FIG. 37 shows an exemplary embodiment of a cycle-accurate validation environment.
Figure 38:
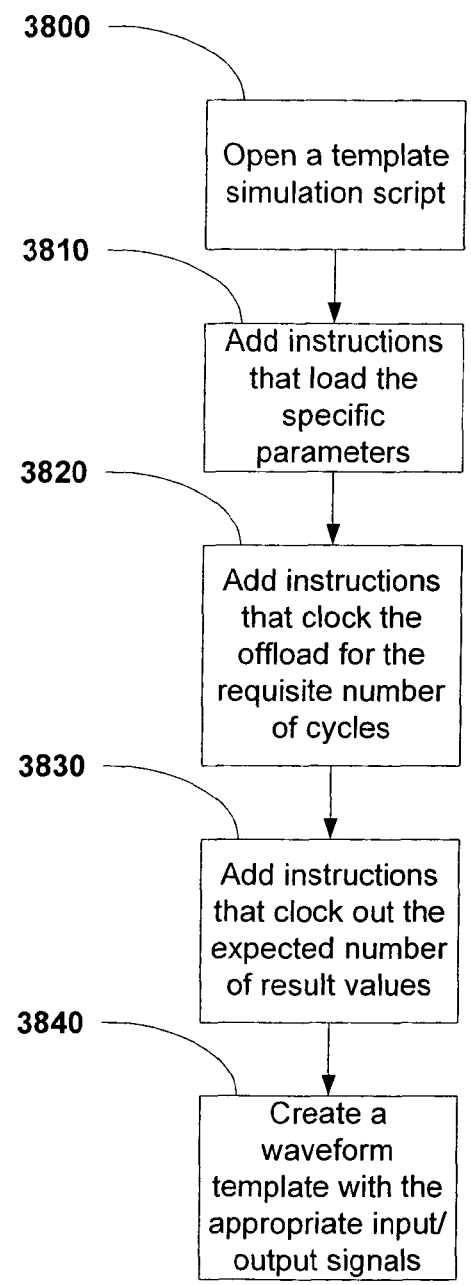
FIG. 38 illustrates an exemplary embodiment of possible flow for automatic test harness generation.

Analysis of the original software program in the manner required to generate the hardware offload logic also makes it possible to generate the accurate simulation environment and offload model shown in the embodiment of FIG. 37 automatically as shown by the example process illustrated in FIG. 38. In FIG. 37, Offload Under Test 3720 represents the offload generated using the procedures and methods described above. It is placed in an environment consisting of a Model 3700 of the processor to which the offload will be attached using connection 3710, and Models 3730 of any memories attached to any of the ports of the Offload Under Test 3720, connected to those ports by one or more connections 3740. The models can be bus-functional or behavioral. A model is said to be bus-functional if the inputs and outputs behave, on a clock-for-clock basis, exactly in the manner that the original modeled element would behave in a fully realized system without necessarily simulating all of the details of what happens inside the block. Alternatively, behavioral models may be used wherein the entire functionality of the block was simulated instead of just the bus-level transactions. The specific nature of the model is not critical to the invention as long as it is cycle-accurate. While FIG.

32 shows Memory models, any other resources with which the offload interacts would be modeled in a similar way.

In the flow shown in the embodiment of FIG. 38, first a template simulation script is opened (Step 3800). This template could have a basic structure pre-written, or could be empty with pre-determined structure being written as the design-specific script is created. The exact structure of any text in the template will depend on the language being used to describe the test environment. The detail of the existence and/or form and/or content of the template is not critical to the invention. Instructions are then added to load the parameters that apply to the specific design (Step 3810). Initial values can be chosen for those parameters; a number of ways of choosing initial values is possible, and the specific choice is not critical to the invention. The choice can be random, arbitrary but deterministic, or made with domain-specific knowledge, or in some other way. The specific way the initial values are chosen is not critical to the invention.

The script then receives instructions to clock for the number of cycles required to complete execution for the specific design (Step 3820). The determination of the number of cycles can be made in any number of ways. A constant number (or symbol or other indicator) longer than the expected run of any accelerator can be used, or a closer number based on adding the clock cycles required for the loading of parameters, execution of logic for a known number of cycles, and updating of result values can be calculated. The specific way the number of clock cycles is determined is not critical to the invention.

After execution, the result values are clocked back out of the offload (Step 3830) for display. A waveform template is created based on the signals pertaining to the specific design, with the waveform being set up to display the results of the simulation executed earlier in the script (Step 3840). The specific signals chosen for display can vary. One way is to use the ports exposed at the highest hierarchical level of the design, plus state machine state values. Other signals may also be exposed. The manner of selecting which signals to expose in the waveform is not critical to the invention.

Figure 39:
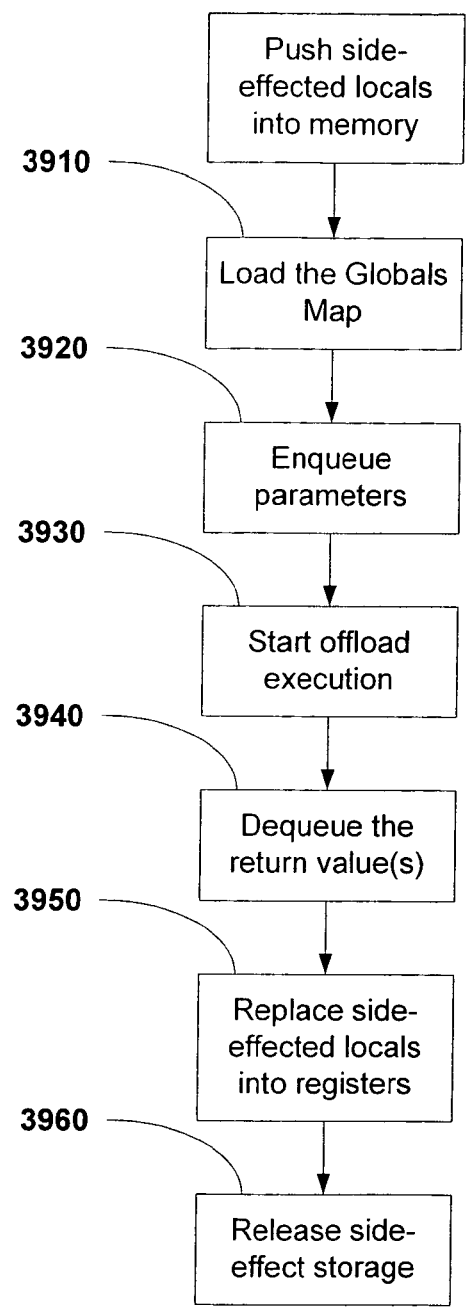
FIG. 39 illustrates an exemplary invocation process for an offload.

Invocation of an offload designed automatically or manually with the architecture described above benefits from several steps, outlined in FIG. 39. If there are any local variables in an enclosing function that could be side-effected, and if they're located in a microprocessor register, these would be completely out of the reach of an offload. So the invocation would need to create a copy of such a variable in memory so that the offload could treat it as a global variable. This is handled as Step 3900. After that, the locations of all global variables, including temporary side-effect variables, are loaded into the Globals Map (Step 3910). Then all parameters are pushed onto the parameter queue (Step 3920). At this point the offload can be instructed to begin execution (Step 3930). Once execution is complete, the result value or values must be dequeued and placed in their appropriate location (Step 3940). Then any temporary side-effect variables need to have their values updated in their original microprocessor register locations (Step 3950), and finally any memory allocated for temporary side-effect variable storage can be released (Step 3960).

Figure 40:
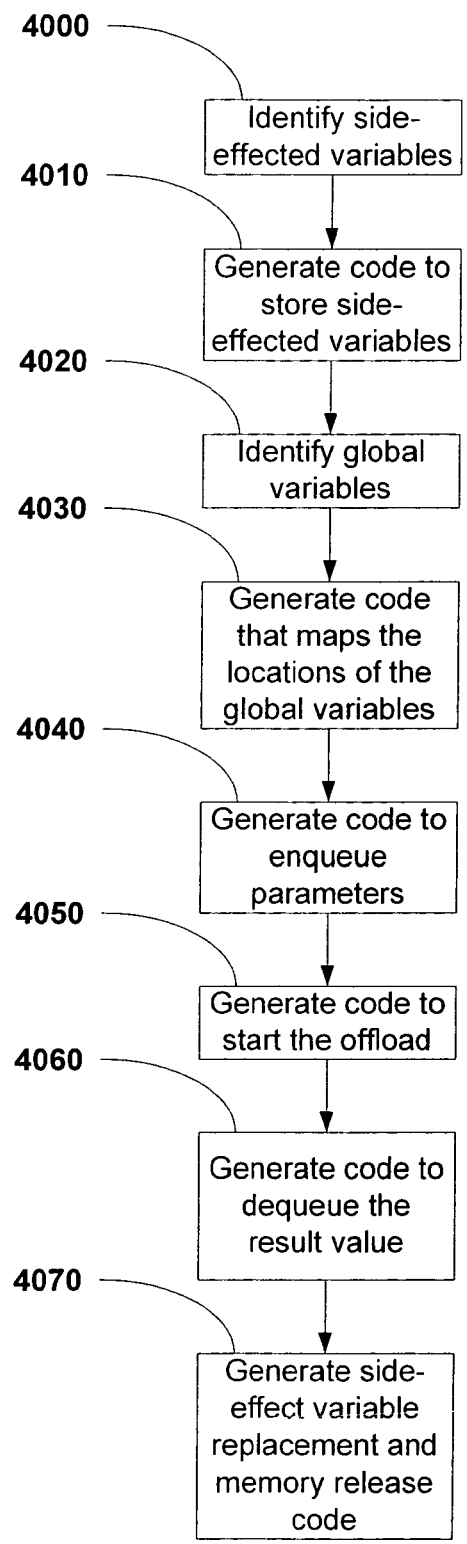
FIG. 40 illustrates an exemplary process that can be used to generate the code that executes the invocation process.

FIG. 40 illustrates an example process that may be used to generate the code that executes the invocation process. First the offloaded code is analyzed to identify all potentially side-effected variables (Step 4000). Then code is generated to create temporary storage for all such variables (Step 4010). Then the offloaded code is analyzed to identify all global variables (including side-effected variables) (Step 4020), and code is generated to place the addresses of all such variables into the Globals Map (Step 4030). Then code is generated to enqueue all of the parameters for the offload, as derived from the original function call (Step 4040). At this point code is generated to start the offload executing (Step 4050) and wait for the return of the offload. Code is then generated to dequeue the result value or values (Step 4060), and finally code is generated to replace side-effected variables and release the memory they temporarily used (Step 4070).

The invocation process and code generation process illustrated above are exemplary; steps could be executed in a different order, and other suitable processes could be created. They are not intended to limit the scope of the invention.

Additional Description

As used herein, the term "embodiment" means an embodiment that serves to illustrate by way of example but not limitation.

It will be appreciated to those skilled in the art that the preceding examples and preferred embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

What is claimed is:

1. A method of generating a test harness for a hardware accelerator comprising:
   accessing a template simulation script corresponding to the hardware accelerator, the hardware accelerator including a plurality of inputs, a clock input, and a plurality of outputs;
   determining a number of clock cycles required to complete execution of the hardware accelerator;
   adding a first set of instructions to the simulation script to provide input parameters to the plurality of inputs during a test of the hardware accelerator;
   adding a second set of instructions to the simulation script to provide clock inputs for the determined number of clock cycles required to complete execution of the hardware accelerator to the clock input during the test of the hardware accelerator;
   adding a third set of instructions to the simulation script to access one or more output values from the plurality of outputs during the test of the hardware accelerator; and
   accessing a waveform template script corresponding to the hardware accelerator, the waveform template script, when executed, configured to display the input parameters, the clock inputs, and the accessed output values.

2. The method of claim 1, wherein the input parameters comprise initial values for the test of the hardware accelerator.

3. The method of claim 2, wherein the initial values are chosen randomly, deterministically, or based on a design of the hardware accelerator.

4. The method of claim 1, wherein the waveform template script is configured to display signals corresponding to ports of a highest hierarchical level of the hardware accelerator.

5. The method of claim 1, wherein the input parameters provided by the first set of instructions comprise input parameters configured to simulate a request, from a host processor, for a performance of the a function of the hardware accelerator.

6. The method of claim 5, wherein the accelerator is configured to:
perform the function based on the input parameters to generate the one or more output values, and
push the one or more output values to the plurality of outputs.

7. A computer program stored on a non-transitory computer-readable media and including instructions for generating a test harness for a hardware accelerator that, when executed by a processor, perform steps comprising:
accessing a template simulation script corresponding to the hardware accelerator, the hardware accelerator including a plurality of inputs, a clock input, and a plurality of outputs;
determining a number of clock cycles required to complete execution of the hardware accelerator;
adding a first set of instructions to the simulation script to provide input parameters to the plurality of inputs during a test of the hardware accelerator;
adding a second set of instructions to the simulation script to provide clock inputs for the determined number of clock cycles required to complete execution of the hardware accelerator to the clock input during the test of the hardware accelerator;
adding a third set of instructions to the simulation script to access one or more output values from the plurality of outputs during the test of the hardware accelerator; and
accessing a waveform template script corresponding to the hardware accelerator, the waveform template script, when executed, configured to display the input parameters, the clock inputs, and the accessed output values.

8. The computer program of claim 7, wherein the input parameters comprise initial values for the test of the hardware accelerator.

9. The computer program of claim 8, wherein the initial values are chosen randomly, deterministically, or based on a design of the hardware accelerator.

10. The computer program of claim 7, wherein the waveform template script is configured to display signals corresponding to ports of a highest hierarchical level of the hardware accelerator.

11. The computer program of claim 7, wherein the input parameters provided by the first set of instructions comprise input parameters configured to simulate a request, from a host processor, for a performance of a function of the hardware accelerator.

12. The computer program of claim 11, wherein the accelerator is configured to:
perform the function based on the input parameters to generate the one or more output values, and
push the one or more output values to the plurality of outputs.

13. A system for generating a test harness for a hardware accelerator comprising:
a non-transitory computer-readable storage medium storing instructions that, when executed, perform steps comprising:
accessing a template simulation script corresponding to the hardware accelerator, the hardware accelerator including a plurality of inputs, a clock input, and a plurality of outputs;
determining a number of clock cycles required to complete execution of the hardware accelerator;
adding a first set of instructions to the simulation script to provide input parameters to the plurality of inputs during a test of the hardware accelerator;
adding a second set of instructions to the simulation script to provide clock inputs for the determined number of clock cycles required to complete execution of the hardware accelerator to the clock input during the test of the hardware accelerator;
adding a third set of instructions to the simulation script to access one or more output values from the plurality of outputs during the test of the hardware accelerator; and
accessing a waveform template script corresponding to the hardware accelerator, the waveform template script, when executed, configured to display the input parameters, the clock inputs, and the accessed output values; and
a processor configured to execute the instructions.

14. The system of claim 13, wherein the input parameters comprise initial values for the test of the hardware accelerator.

15. The system of claim 14, wherein the initial values are chosen randomly, deterministically, or based on a design of the hardware accelerator.

16. The system of claim 13, wherein the waveform template script is configured to display signals corresponding to ports of a highest hierarchical level of the hardware accelerator.

17. The system of claim 13, wherein the input parameters provided by the first set of instructions comprise input parameters configured to simulate a request, from a host processor, for a performance of a function of the hardware accelerator.

18. The system of claim 17, wherein the accelerator is configured to:
perform the/function based on the input parameters to generate the one or more output values, and
push the one or more output values to the plurality of outputs.

* * * * *

UNITED STATES PATENT AND TRADEMARK OFFICE
CERTIFICATE OF CORRECTION

PATENT NO. : 9,690,630 B2  
APPLICATION NO. : 14/637354  
DATED : June 27, 2017  
INVENTOR(S) : Navendu Sinha et al.

Page 1 of 1

It is certified that error appears in the above-identified patent and that said Letters Patent is hereby corrected as shown below:

Claim 5, Line 66: in Column 22 replace "performance of the a function" with -- performance of a function --.

Signed and Sealed this  
Sixth Day of March, 2018

Andrei Iancu  
*Director of the United States Patent and Trademark Office*